(12) United States Patent
Colby

(10) Patent No.: US 9,495,852 B1
(45) Date of Patent: Nov. 15, 2016

(54) ELECTRONICALLY SWITCHABLE RFID TAGS

(71) Applicant: Steven M. Colby, Mountain View, CA (US)

(72) Inventor: Steven M. Colby, Mountain View, CA (US)

(*) Notice: Subject to any disclaimer, the term of this patent is extended or adjusted under 35 U.S.C. 154(b) by 6 days.

(21) Appl. No.: 14/468,110

(22) Filed: Aug. 25, 2014

Related U.S. Application Data

(63) Continuation of application No. 12/577,209, filed on Oct. 12, 2009, now Pat. No. 8,816,826, which is a continuation-in-part of application No. 11/382,050, filed on May 7, 2006, now abandoned, and a continuation-in-part of application No. 11/382,052, filed on May 7, 2006, now abandoned, and a continuation-in-part of application No. 11/382,053, filed on May 7, 2006, now abandoned, and a continuation-in-part of application No. 11/382,054, filed on May 8, 2006, now abandoned, and a continuation-in-part of application No. 11/382,264, filed on May 8, 2006, now abandoned, and a (Continued)

(51) Int. Cl.
*G08B 13/14* (2006.01)
*G08B 13/24* (2006.01)

(52) U.S. Cl.
CPC .................. *G08B 13/2405* (2013.01)

(58) Field of Classification Search
CPC ........... G06K 19/025; G06K 19/0723; G06K 19/07354; G06K 19/07749
USPC ................. 340/10.34, 10.41, 572.3
See application file for complete search history.

(56) References Cited

U.S. PATENT DOCUMENTS

| | | |
|---|---|---|
| 4,575,601 A | 3/1986 | Taguchi et al. |
| 4,744,497 A | 5/1988 | O'Neal |
| 5,206,495 A | 4/1993 | Kreft |
| 5,327,115 A | 7/1994 | Swierczek |
| 5,380,046 A | 1/1995 | Stephens |
| 5,506,395 A | 4/1996 | Eppley |
| 5,521,590 A | 5/1996 | Hanaoka et al. |
| 5,538,291 A | 7/1996 | Gustafson |
| 5,640,151 A | 6/1997 | Reis et al. |
| 5,686,902 A | 11/1997 | Reis et al. |
| 5,700,037 A | 12/1997 | Keller |
| 5,847,662 A | 12/1998 | Yokota et al. |
| 5,942,978 A * | 8/1999 | Shafer ................ E05B 73/0017 340/10.5 |
| 5,966,082 A | 10/1999 | Cofino et al. |
| 6,130,602 A | 10/2000 | O'Toole et al. |
| 6,144,299 A | 11/2000 | Cole |
| 6,158,777 A | 12/2000 | Twardosz |
| 6,199,762 B1 | 3/2001 | Hohle |
| 6,282,407 B1 | 8/2001 | Vega et al. |
| 6,320,169 B1 | 11/2001 | Clothier |

(Continued)

FOREIGN PATENT DOCUMENTS

| | | |
|---|---|---|
| DE | 10 2004 008 840 A1 | 9/2005 |
| JP | 11-348471 A | 12/1999 |

(Continued)

OTHER PUBLICATIONS

Juels, Ari, et al. "Security and Privacy Issues in E-passports", SECURECOMM'05, vol. 00 2005, Sep. 5, 2009, pp. 1-12.

(Continued)

*Primary Examiner* — Omer S Khan

(57) ABSTRACT

Various switchable RFID devices are disclosed. These switchable RFID devices may include one or more RFID tags and one or more switches. Some of these one or more switches are optionally wireless. In various embodiments, the switchable RFID devices include identity devices, financial devices, remote controls, and the like. In some embodiments, switches are configured to enter data into a switchable RFID device, for example to select a financial account.

17 Claims, 22 Drawing Sheets

Related U.S. Application Data continuation-in-part of application No. 11/382,265, filed on May 8, 2006, now abandoned, and a continuation-in-part of application No. 11/420,721, filed on May 26, 2006, now abandoned.

(60) Provisional application No. 60/678,428, filed on May 6, 2005, provisional application No. 60/685,331, filed on May 27, 2005, provisional application No. 60/700,884, filed on Jul. 19, 2005, provisional application No. 60/712,308, filed on Aug. 30, 2005, provisional application No. 60/715,641, filed on Sep. 10, 2005, provisional application No. 60/752,933, filed on Dec. 21, 2005, provisional application No. 60/758,751, filed on Jan. 13, 2006, provisional application No. 60/782,068, filed on Mar. 13, 2006, provisional application No. 60/744,154, filed on Apr. 3, 2006, provisional application No. 60/746,636, filed on May 6, 2006.

(56) References Cited

U.S. PATENT DOCUMENTS

| | | |
|---|---|---|
| 6,471,127 B2 | 10/2002 | Pentz et al. |
| 6,531,964 B1 | 3/2003 | Loving |
| 6,593,845 B1 | 7/2003 | Friedman et al. |
| 6,719,206 B1 | 4/2004 | Bashan et al. |
| 7,015,791 B2 | 3/2006 | Huntzicker |
| 7,051,205 B1 | 5/2006 | Horiguchi et al. |
| 7,218,233 B2 | 5/2007 | Bon |
| 7,246,754 B2 | 7/2007 | Siuta et al. |
| 7,290,709 B2 | 11/2007 | Tsai et al. |
| 7,446,646 B2 | 11/2008 | Huomo |
| 7,591,415 B2 | 9/2009 | Jesme |
| 7,701,408 B2 | 4/2010 | Bombay et al. |
| 7,719,425 B2 | 5/2010 | Colby |
| 7,832,771 B2 | 11/2010 | Hoeppner et al. |
| 7,924,156 B2 | 4/2011 | Colby |
| 2001/0017799 A1 | 8/2001 | Chen et al. |
| 2002/0017557 A1 | 2/2002 | Hendrick |
| 2002/0047777 A1 | 4/2002 | Casden |
| 2002/0089434 A1* | 7/2002 | Ghazarian ............ G06Q 10/08 340/988 |
| 2002/0117243 A1 | 8/2002 | Koren |
| 2003/0014891 A1 | 1/2003 | Nelms et al. |
| 2003/0030568 A1 | 2/2003 | Lastinger et al. |
| 2003/0042318 A1 | 3/2003 | Krishna et al. |
| 2003/0057286 A1 | 3/2003 | Yamagishi et al. |
| 2003/0095034 A1 | 5/2003 | Clothier |
| 2003/0209601 A1 | 11/2003 | Chung |
| 2004/0089724 A1 | 5/2004 | Lasch et al. |
| 2004/0145453 A1 | 7/2004 | Tuttle |
| 2004/0169087 A1 | 9/2004 | Lasch et al. |
| 2004/0212503 A1 | 10/2004 | Stilp |
| 2004/0233040 A1 | 11/2004 | Lane et al. |
| 2004/0237360 A1 | 12/2004 | Nelms et al. |
| 2004/0256469 A1 | 12/2004 | Faenza, Jr. et al. |
| 2004/0263319 A1 | 12/2004 | Huomo |
| 2005/0011776 A1 | 1/2005 | Nagel |
| 2005/0093703 A1 | 5/2005 | Twitchell, Jr. |
| 2005/0145688 A1 | 7/2005 | Milenkovic et al. |
| 2005/0171898 A1 | 8/2005 | Bishop et al. |
| 2005/0174239 A1 | 8/2005 | Shanks et al. |
| 2005/0192053 A1 | 9/2005 | Kao et al. |
| 2005/0205665 A1 | 9/2005 | Lasch et al. |
| 2005/0207229 A1 | 9/2005 | Takeuchi |
| 2005/0236489 A1 | 10/2005 | Droz |
| 2005/0242950 A1 | 11/2005 | Lindsay et al. |
| 2005/0253683 A1 | 11/2005 | Lowe |
| 2005/0263591 A1 | 12/2005 | Smith |
| 2005/0274794 A1 | 12/2005 | Bason et al. |
| 2006/0005050 A1 | 1/2006 | Basson et al. |
| 2006/0109084 A1 | 5/2006 | Yarvis |
| 2006/0164250 A1 | 7/2006 | Kawai |
| 2006/0186989 A1 | 8/2006 | Chon et al. |
| 2006/0187040 A1 | 8/2006 | Sweeny |
| 2006/0245530 A1 | 11/2006 | Pradhan et al. |
| 2006/0254815 A1 | 11/2006 | Humphrey et al. |
| 2006/0266831 A1 | 11/2006 | Kozlay |
| 2007/0024423 A1 | 2/2007 | Nikitin et al. |
| 2007/0057790 A1 | 3/2007 | Alden et al. |
| 2007/0057792 A1 | 3/2007 | Alden |
| 2007/0075140 A1 | 4/2007 | Guez et al. |
| 2007/0090927 A1 | 4/2007 | Potyrailo et al. |
| 2007/0152829 A1 | 7/2007 | Lindsay et al. |
| 2007/0164866 A1 | 7/2007 | Robin et al. |
| 2007/0194116 A1 | 8/2007 | Arnold |
| 2008/0169901 A1 | 7/2008 | Timm et al. |
| 2008/0238679 A1 | 10/2008 | Rofougaran et al. |

FOREIGN PATENT DOCUMENTS

| | | |
|---|---|---|
| WO | 0016570 A1 | 3/2000 |
| WO | 2005/062246 A1 | 7/2005 |

OTHER PUBLICATIONS

Peterson, Erik, "US Issues First e-passports to diplomats, citizen issuance to start later in '06", SecureID News, Apr. 20, 2006, 3 pages.

Moss, Frank, "How the US Passport Program Enhances Border Security", travel.state.gov, Jun. 22, 2005, 5 pages.

Unknown, "CDT Working Group on RFID: Privacy Best Practices for Deployment of RFID Technology", www.cdt.org, May 1, 2006, 7 pages.

Moss, Frank, Statement, Committee on International Relations, wwwc.house.gov, Jun. 23, 2004, 4 pages.

Goo, Sara Kehaulani, "Security Concerns Prompt Passport Redesign", www.washingtonpost.com, Apr. 30, 2005, 3 pages.

Unknown, "Information Security Radio Frequency Identification Technology in the Federal Government", GAO-05-551, May 27, 2005, 41 pages.

Yoshida, Junko, "Tests Reveal e-Passport Security Flaw", www.eetimes.com, Aug. 30, 2004, 3 pages.

Unknown, "Characteristics of Metal Shielding Textiles", www.rfsafe.com, printed Aug. 2005, 2 pages.

Unknown, "EMF Shielding & Conductive Fabrics", www.lessemf.com/fabric.html, The EMF Safety Superstore, Aug. 4, 2005, 12 pages.

Yu, Roger, "Electronic Passports Set to Thwart Forgers", USATODAY, Aug. 8, 2005, 4 pages.

Schneier, Bruce, "Schneier on Security, A Weblog Covering Security and Secure Technology" Nov. 3, 2005, 18 pages.

Schneier, Bruce, "Schneier on Security, a Weblog Covering Security and Secure Technology" Aug. 9, 2005, 19 pages.

Unknown, "Foiling the Oyster Card", Spy Blog, Feb. 16, 2004, 5 pages.

Unknown, www.WalletGard.com/contact.html, Protect Yourself Against Identity Theft, Revised Feb. 19, 2006, 2 pages.

U.S. Appl. No. 11/350,309, filed Feb. 27, 2006, Colby, Steven M., Non-Final Office Action Issued Feb. 19, 2008, 5 pages.

U.S. Appl. No. 11/350,309, filed Feb. 27, 2006, Colby, Steven M., Non-Final Office Action Issued May 14, 2008, 9 pages.

U.S. Appl. No. 11/350,309, filed Feb. 27, 2006, Colby, Steven M., Non-Final Office Action Issued Jan. 12, 2009, 14 pages.

U.S. Appl. No. 11/350,309, filed Feb. 27, 2006, Colby, Steven M., Final Office Action Issued Sep. 23, 2009, 15 pages.

U.S. Appl. No. 11/350,309, filed Feb. 27, 2006, Colby, Steven M., Notice of Allowance and Allowability, Issued Jan. 11, 2010.

U.S. Appl. No. 12/777,474, filed May 11, 2010, Colby, Steven M., Non-Final Office Action issued Feb. 18, 2011, 7 pages.

U.S. Appl. No. 12/777,474, filed May 11, 2010, Colby, Steven M., Non-Final Office Action issued Dec. 28, 2011, 13 pages.

U.S. Appl. No. 12/777,474, filed May 11, 2010, Colby, Steven M., Non-Final Office Action issued Apr. 4, 2011, 9 pages.

U.S. Appl. No. 11/420,721, filed May 26, 2006, Colby, Steven M., Non-Final Office Action issued Apr. 8, 2009, 18 pages.

(56) References Cited

OTHER PUBLICATIONS

U.S. Appl. No. 11/468,026, filed Aug. 29, 2006, Colby, Steven M., Non-Final Office Action issued Apr. 10, 2009, 22 pages.
U.S. Appl. No. 11/382,050, filed May 7, 2006, Colby, Steven M., Non-Final Office Action issued Apr. 8, 2009, 15 pages.
U.S. Appl. No. 11/382,052, filed May 7, 2006, Colby, Steven M., Non-Final Office Action issued Apr. 8, 2009, 18 pages.
U.S. Appl. No. 11/382,265, filed May 8, 2006, Colby, Steven M., Non-Final Office Action issued Apr. 10, 2009, 16 pages.
U.S. Appl. No. 11/382,054, filed May 8, 2006, Colby, Steven M., Non-Final Office Action issued Apr. 10, 2009, 17 pages.
U.S. Appl. No. 11/382,053, filed May 7, 2006, Colby, Steven M., Non-Final Office Action issued Apr. 8, 2009, 19 pages.
U.S. Appl. No. 12/577,209, filed Oct. 12, 2009, Colby, Steven M., Non-Final Office Action issued Mar. 21, 2012, 22 pages.
U.S. Appl. No. 12/577,209, filed Oct. 12, 2009, Colby, Steven M., Final Rejection issued Aug. 10, 2012, 24 pages.
Hornyak, Tim, "RFID Powder", Scientific American, Feb. 2008, pp. 68-71.
PCT/99/21073, International Search Report dated Dec. 2, 1999, 3 pages.
U.S. Appl. No. 11/458,620, filed Jul. 19, 2006, Colby, Steven M., Non-Final Office Action issued Jun. 24, 2010, 6 pages.
U.S. Appl. No. 11/458,620, filed Jul. 19, 2006, Colby, Steven M., Non-Final Office Action issued Mar. 30, 2009, 19 pages.
U.S. Appl. No. 11/458,620, filed Jul. 19, 2006, Colby, Steven M., Non-Final Office Action issued Dec. 14, 2009, 23 pages.
Deutschbein, Carlos Vila, "Digital Frequency Shifting for Electroacoustic Feedback Suppression", in Audio Engineering Society Convention Paper, Presented at the 118th Convention, May 28-31, 2005, Barcelona, Spain.
English translation of JP11348471A.
Leach, "Passports go electronic with new microchip", The Christian Science Monitor, Dec. 9, 2004, 6 pages.
Schimke, et al., "Security analysis for biometric data in ID documents", SPIE.Digital Library, Mar. 31, 2005, 5 pages.
Schimke, et al., "Security analysis for biometric data in ID documents", SPIE vol. 5681, Mar. 31, 2005, p. 474-485.
E-Passport Mock Port of Entry Test, Nov. 29-Dec. 2, 2004, 150 pages.
U.S. Appl. No. 13/084,433, filed Apr. 11, 2011, Colby, Steven M., Non-Final Office Action issued Sep. 9, 2013, 15 pages.
U.S. Appl. No. 13/084,433, filed Apr. 11, 2011, Colby, Steven M., Final Rejection issued Jan. 2, 2014, 21 pages.
U.S. Appl. No. 13/084,433, filed Apr. 11, 2011, Colby, Steven M., Non-Final Office Action issued Jun. 5, 2014, 21 pages.
U.S. Appl. No. 13/084,433, filed Apr. 11, 2011, Colby, Steven M., Final Rejection issued Sep. 29, 2014, 19 pages.
U.S. Appl. No. 60/671,790, Mahaffey, Kevin, filed Apr. 14, 2005.
U.S. Appl. No. 11/350,309, Steven M. Colby, Radio Frequency Shielding, filed Feb. 7, 2006.
U.S. Appl. No. 11/458,620, Steven M. Colby, Electronically Switchable RFID Tags, filed Jul. 19, 2006.
U.S. Appl. No. 13/084,433, Steven M. Colby, Financial Device Including Switchable RFID Tag, filed Apr. 11, 2011.
U.S. Appl. No. 12/577,209, Steven M. Colby, Passive Radio Frequency Data Logger, filed Oct. 12, 2009.
U.S. Appl. No. 14/659,072, Steven Michael Colby, RFID Security System, filed Mar. 16, 2015.
U.S. Appl. No. 14/660,825, Steven Michael Colby, Integrated RFID Capable Commun ication Device, filed Mar. 17, 2015.
U.S. Appl. No. 14/660,907, Steven Michael Colby, Mechanically Programmable RFID, filed Mar. 17, 2015.
U.S. Appl. No. 14/660,927, Steven Michael Colby, RFID Sensor, filed Mar. 17, 2015.

* cited by examiner

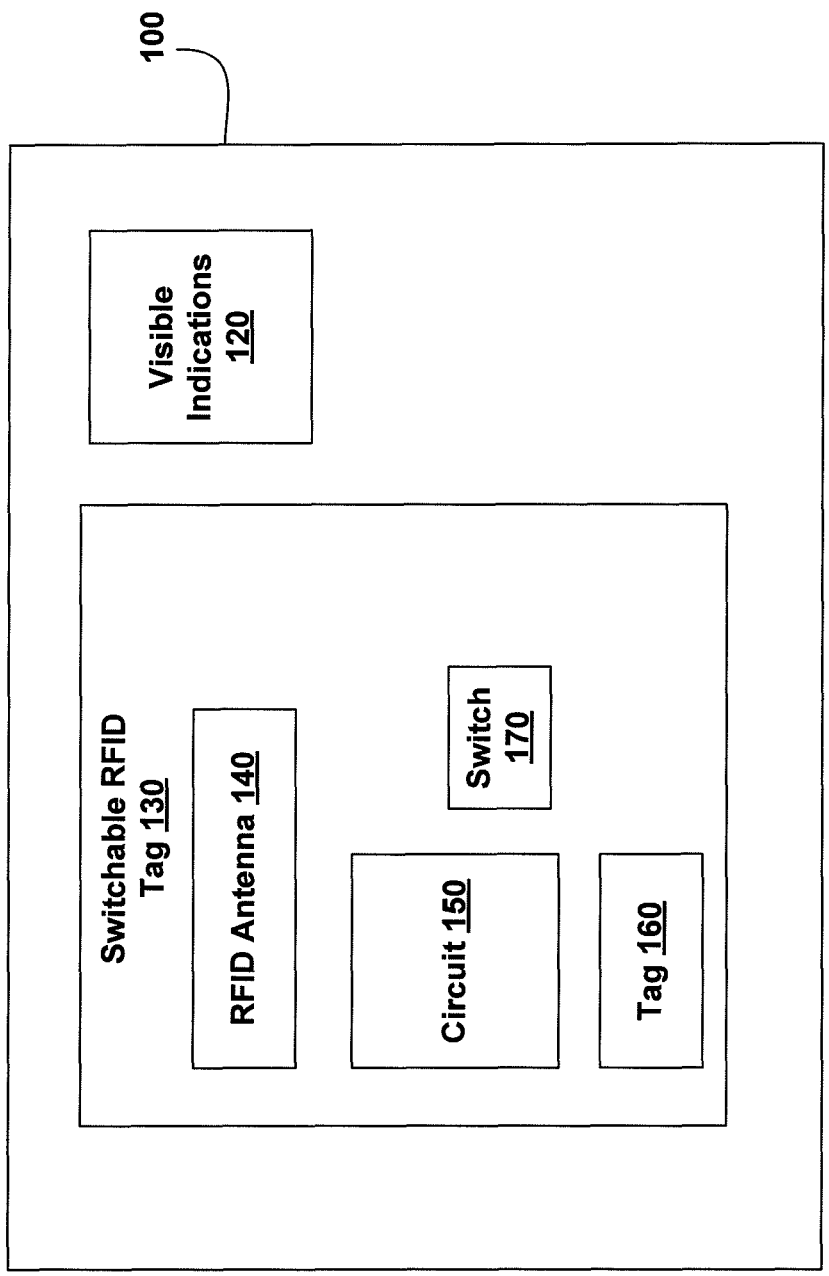

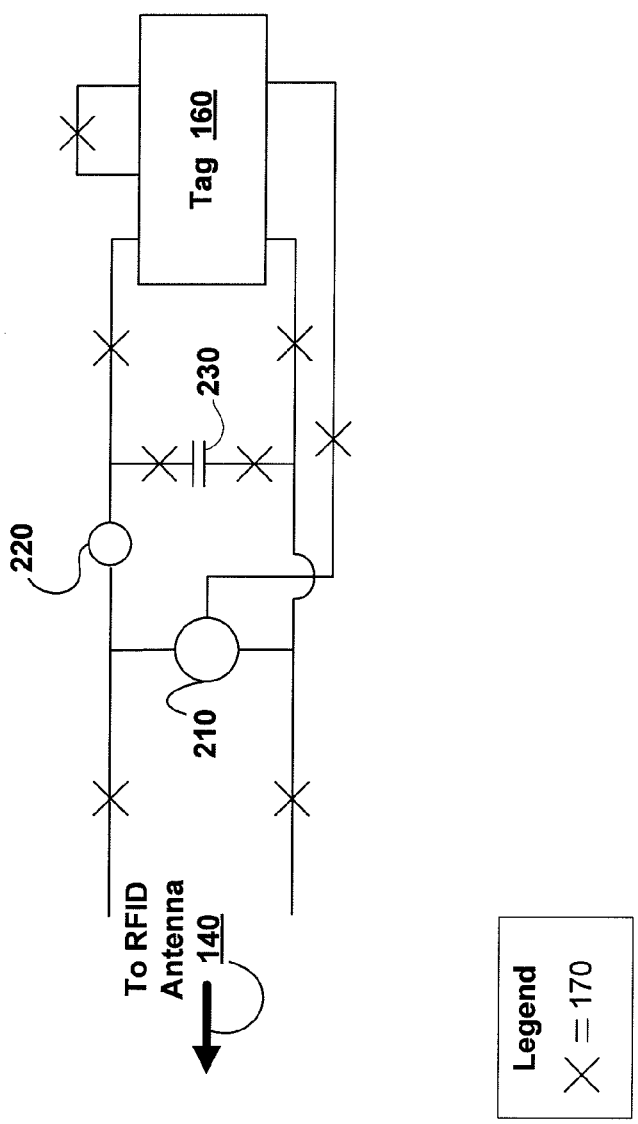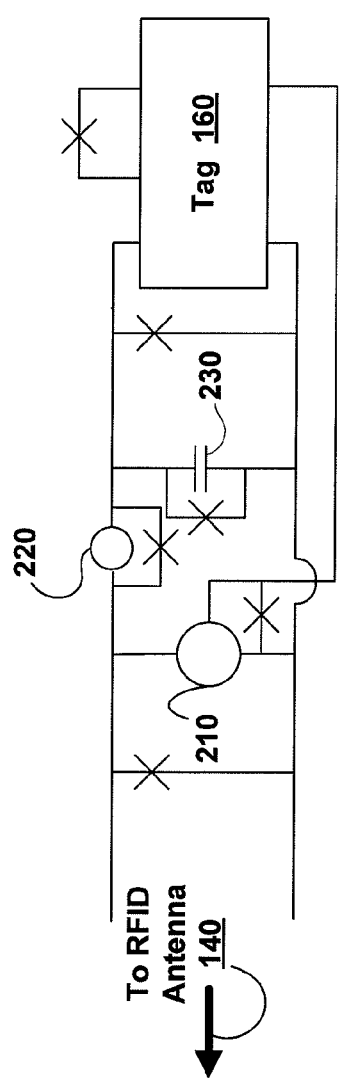

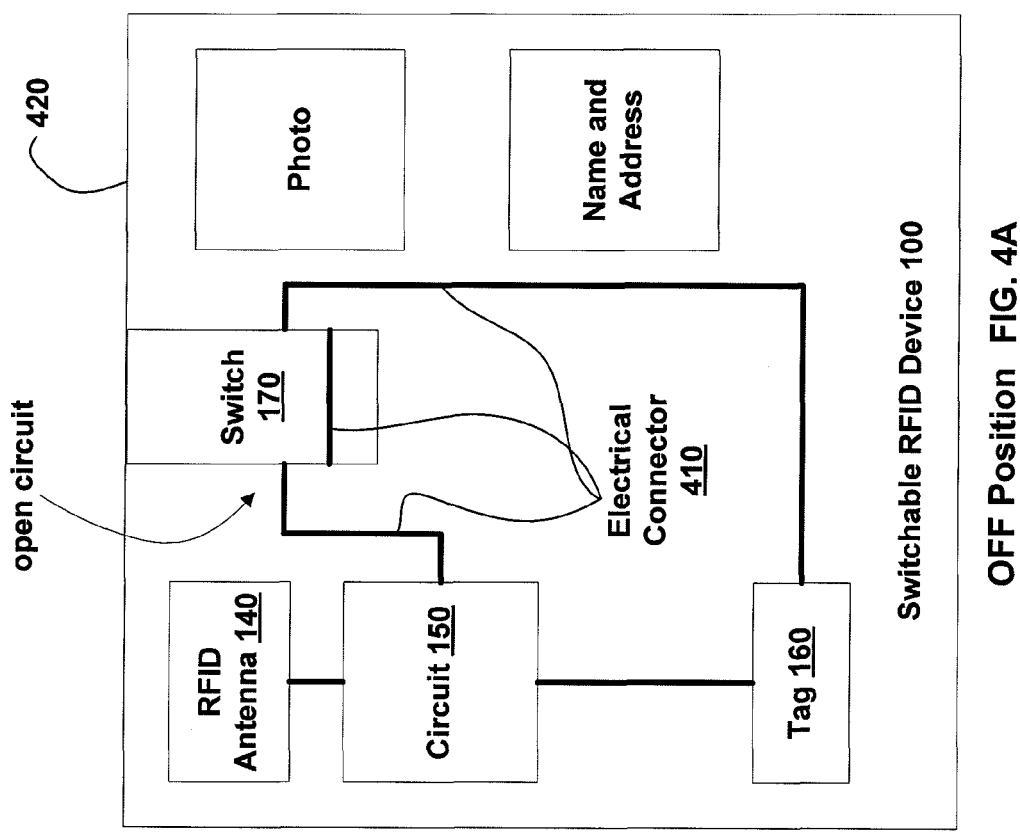

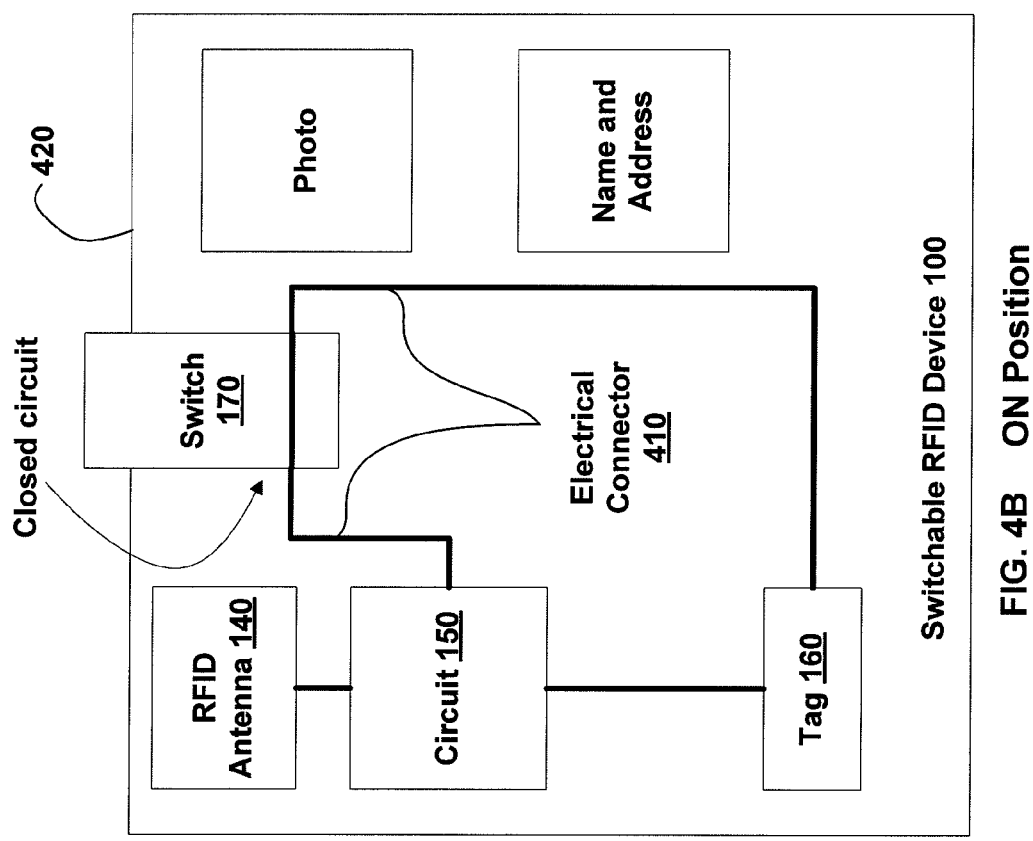
FIG. 4B  ON Position

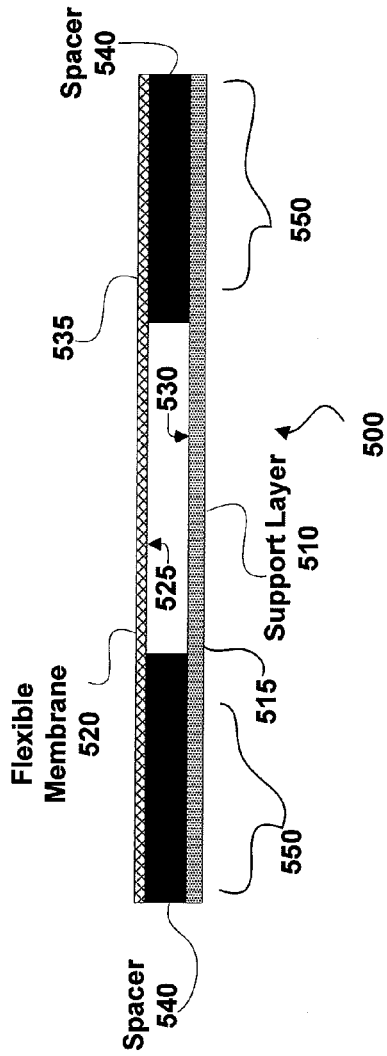
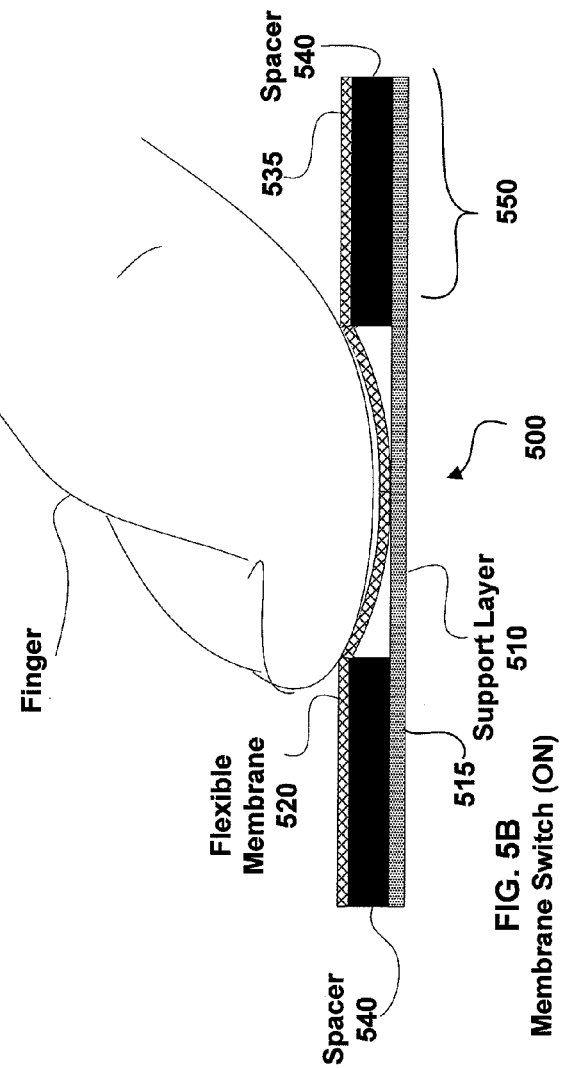
FIG. 5A
Membrane Switch (OFF)
FIG. 5B
Membrane Switch (ON)

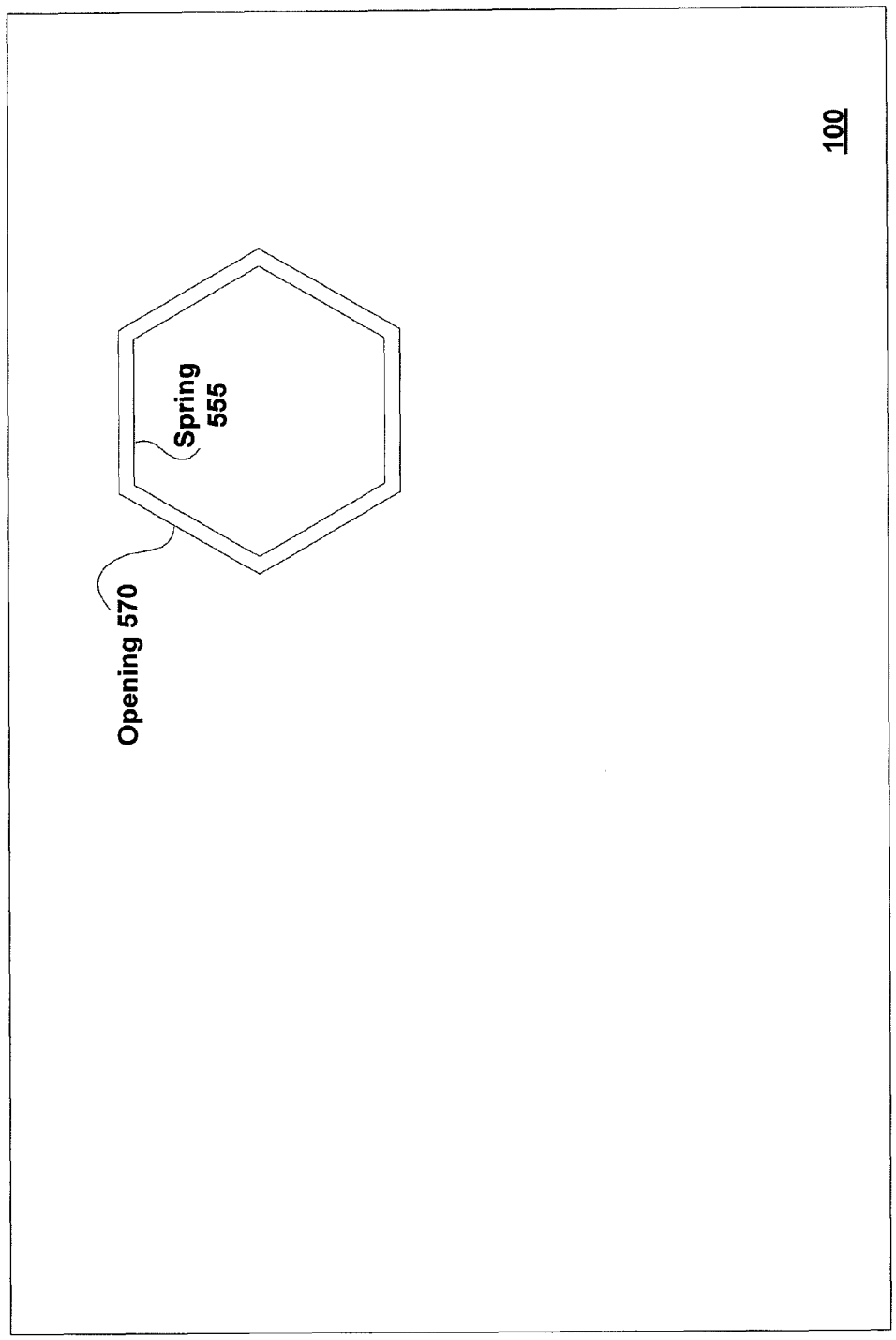

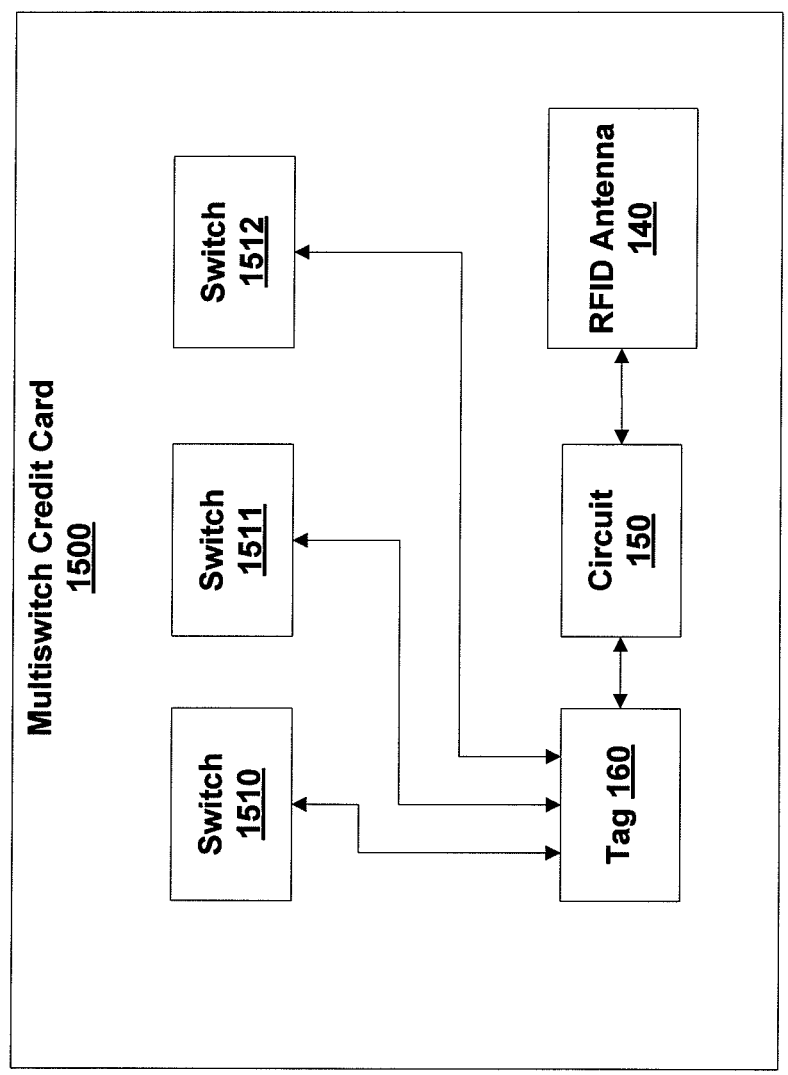

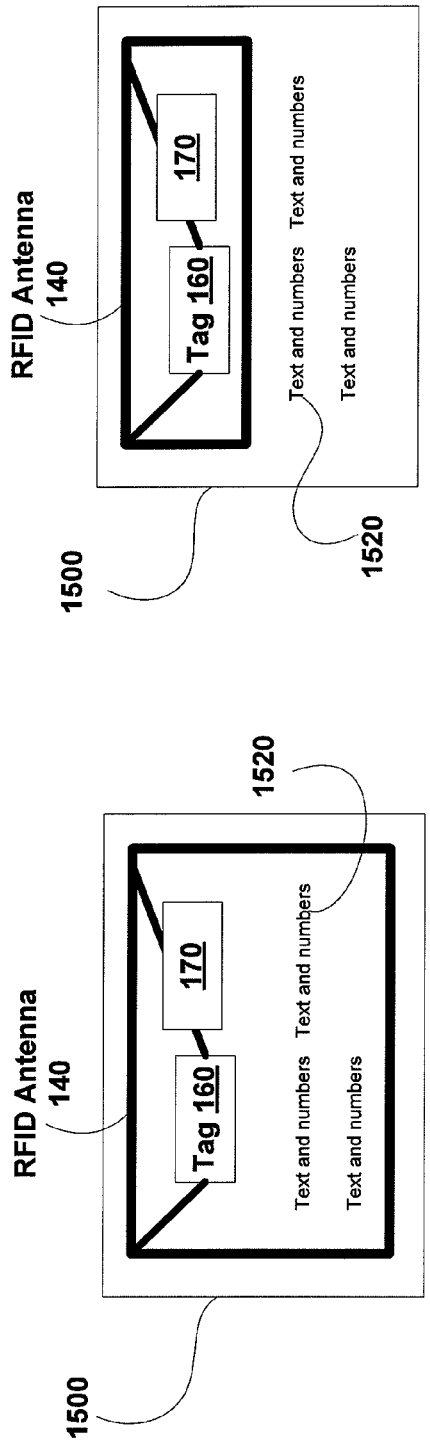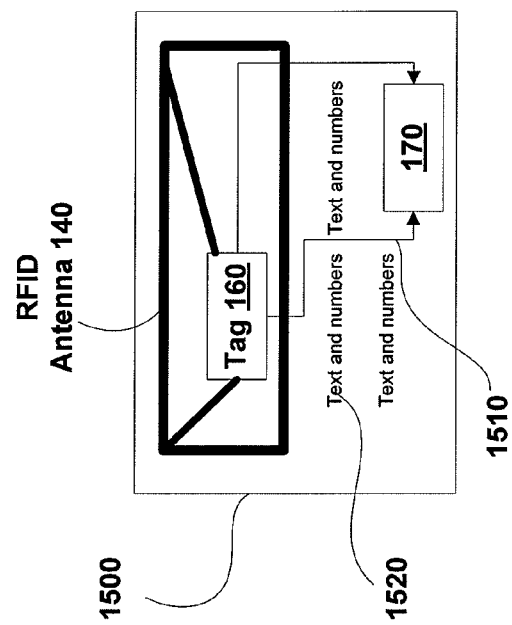
FIG. 16A
FIG. 16B
FIG. 16C

ELECTRONICALLY SWITCHABLE RFID TAGS

CROSS-REFERENCE TO RELATED APPLICATIONS

This application is
a continuation of U.S. nonprovisional application Ser. No. 12/577,209 filed Oct. 12, 2009;
U.S. nonprovisional application Ser. No. 12/577,209 is a continuation-in-part of U.S. nonprovisional application Ser. No. 11/382,050 filed May 7, 2006 which in turn claims benefit and priority to U.S. provisional patent applications:
60/678,428 filed May 6, 2005; and
60/685,331 filed May 27, 2005;
U.S. nonprovisional application Ser. No. 12/577,209 is also a continuation-in-part of U.S. nonprovisional application Ser. No. 11/382,052 filed May 7, 2006;
U.S. nonprovisional application Ser. No. 12/577,209 is also a continuation-in-part of U.S. nonprovisional application Ser. No. 11/382,053 filed May 7, 2006;
U.S. nonprovisional application Ser. No. 12/577,209 is also a continuation-in-part of U.S. nonprovisional application Ser. No. 11/382,054 filed May 8, 2006;
U.S. nonprovisional application Ser. No. 12/577,209 is also a continuation-in-part of U.S. nonprovisional application Ser. No. 11/382,265 filed May 8, 2006;
U.S. nonprovisional application Ser. No. 12/577,209 is also a continuation-in-part of U.S. nonprovisional application Ser. No. 11/382,264 filed May 8, 2006;
U.S. nonprovisional application Ser. No. 12/577,209 is also a continuation-in-part of U.S. nonprovisional application Ser. No. 11/420,721 filed May 26, 2006; and
U.S. nonprovisional application Ser. No. 12/577,209 is also claims benefit of U.S. provision patent applications:
60/700,884 filed Jul. 19, 2005;
60/712,308 filed Aug. 30, 2005;
60/715,641 filed Sep. 10, 2005;
60/752,933 filed Dec. 21, 2005;
60/758,751 filed Jan. 13, 2006;
60/782,068 filed Mar. 13, 2006;
60/744,154 filed Apr. 3, 2006, and
60/746,636 filed May 6, 2006.

The disclosures of the above provisional and nonprovisional patent applications are hereby incorporated herein by reference.

The disclosure of U.S. nonprovisional patent application Ser. No. 11/350,309 filed Feb. 7, 2006 is also hereby incorporated herein by reference.

BACKGROUND OF THE INVENTION

1. Field of the Invention

The invention is in the field of electronic devices and more specifically in the field of radio frequency identification (RFID) tags.

2. Description of Related Art

RFID tags are typically small, flexible, and low profile devices that can be affixed to items for electronic tracking and information storage purposes. An RFID tag can be read by an RFID reader when the RFID tag is brought within a certain vicinity of the reader while the reader is broadcasting an appropriate signal. In some cases, once within that vicinity, the RFID tag receives sufficient power from the broadcast signal to permit the RFID tag to transmit a return radio frequency signal. This type of RFID tag is referred to as a passive RFID tag because it does not include an independent power source. Passive RFID tags may receive power either via a radio frequency signal (e.g., radio waves) or through electromagnetic induction. Typically, electromagnetic induction is easier to implement but operates over a shorter range. Electromagnetic induction may operate at lower frequencies than RF powered RFID tags. In other cases an RFID tag includes an independent power source for generating a radio frequency signal. This type of RFID tag is referred to as an active RFID tag.

RFID tags generate a return radio frequency signal that may include an encoded copy of information stored within the RFID tag. As RFID tags achieve more wide spread use they will become ubiquitous on forms of tagging, labeling, identification, and be included in personal and business effects, such as passports, driver's licenses, keys, cell phones, credit cards, PDAs, and so forth. For example, an RFID tag may be incorporated in a driver's license to store personal information about the licensee or in a product label to track inventory.

A problem with using RFID tags to store security, confidential and/or personal information is that an RFID reader can read any RFID tags that pass within its range. Even if data is encrypted, this creates a possibility of unauthorized access to the personal data and other information stored in the RFID tag.

BRIEF DESCRIPTION OF DRAWINGS

FIG. 1 is a block diagram of a switchable RFID device, according to various embodiments of the invention;

FIGS. 2 and 3 illustrate some of many possible locations for a switch within a switchable RFID device, according to various embodiments of the invention;

FIG. 4A illustrates an OFF Position of a switch, according to various embodiments of the invention;

FIG. 4B illustrates an ON position of a switch, according to various embodiments of the invention;

FIGS. 5A and 5B illustrates a membrane switch, according to various embodiments of the invention;

FIG. 6 illustrates a top view of a membrane switch, according to various embodiments of the invention;

FIG. 15 illustrates a multiswitch credit card, according to various embodiments of the invention;

FIGS. 16A-16C illustrate an antenna within a credit card, according to various embodiments of the invention;

SUMMARY

Figure 5C:
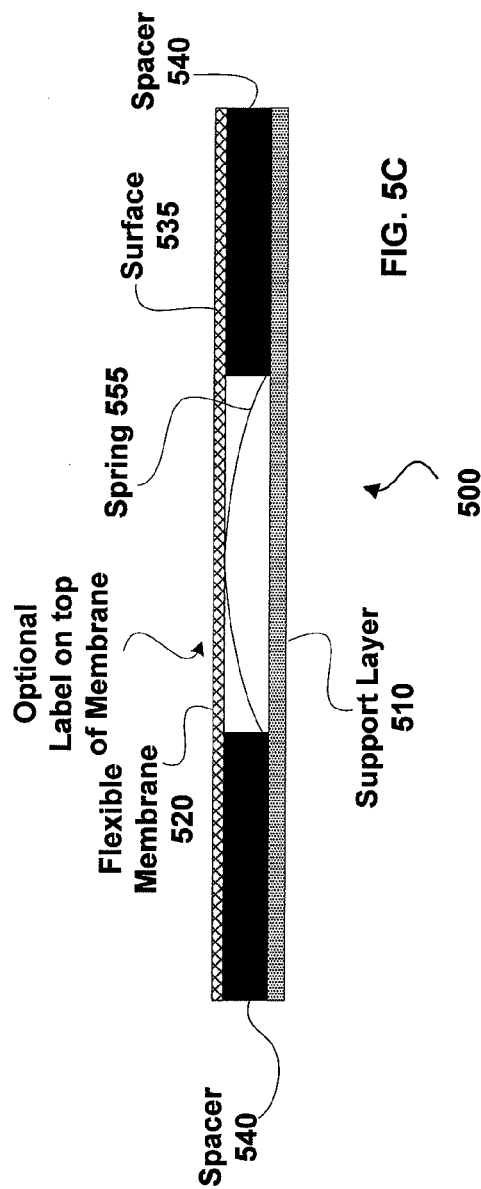
FIG. 5C illustrates an embodiment of a membrane switch including a spring, according to various embodiments of the invention.

Various embodiments of the invention include a remotely powered RFID (radio frequency identity) tag having an electronically controlled switch. This switch is optionally a remotely (wirelessly) controlled switch. In some embodiments, when the switch is in an off state, the RFID tag will not transmit and when the switch is in an on state the RFID tag will transmit in response to an RF (radio frequency) signal. In some embodiments, the switch includes multiple on states in which different information or signals are transmitted responsive to the state of the switch. The RFID tag includes a memory configured to store the states of the RFID tag and an integrated circuit configured to determine whether to transmit responsive to the stored state of the RFID tag and a received RF signal.

Various embodiments of the invention include switchable RFID devices. These switchable RFID devices can include identity documents such as passports or driver's licenses, financial cards such as credit or debit cards, remote controls, security devices, access devices, communication devices, or the like. In some embodiments, more than one switchable RFID tag is included in a single RFID device. In various embodiments, one or more switches are used to change operation of an RFID tag from a responsive state to a non-responsive state, to change operation of an RFID tag from one responsive state to another responsive state, to enter data into an RFID device, to control an external device, or the like. In various embodiments, the switches are electronic, wireless, and/or mechanical.

Various embodiments of the invention includes an RFID tag comprising an antenna configured to receive data in a first RF signal, to receive energy from the first RF signal, and to transmit data in a second RF signal, the transmission of the second RF signal being powered by the energy received from the first RF signal; and an integrated circuit including an input configured to receive data from the antenna and to receive power resulting from the energy received from the antenna, an output configured to provide an RF signal to the antenna for transmission, a state memory configured to store an ON/OFF state of the RFID tag, a key memory configured for storing a key for changing the ON/OFF state stored in the state memory, and a switch logic configured to receive data from the input, to read the key from the key memory, to compare the received data with the read key, and to change the ON/OFF state stored in the state memory responsive to this comparison, the switch logic is further configured to determine whether or not to provide a second RF signal to the antenna for transmission, the determination being responsive to the ON/OFF state stored in the state memory.

Various embodiments of the invention include a method of changing an ON/OFF state of an RFID Tag, the method comprising receiving energy sufficient to power the RFID Tag through an RF antenna included in the RFID tag, receiving first data through the RF antenna, reading a key from a key memory, using an integrated circuit to compare the first data received through the RF antenna with the key read from the key memory, the integrated circuit powered by the received energy, and writing data to state memory responsive to the comparison, the data written to the state memory being configured to change the RFID tag from an OFF state in which the RFID tag will not transmit an RF signal to an ON state in which the RFID tag will transmit an RF signal.

Various embodiments of the invention includes a method of operating an RFID tag, the method comprising receiving energy sufficient to power the RFID tag through an RF antenna included in the RFID tag, reading a state from state memory, sending an RF response through the RF antenna unless the read state is an OFF state.

Various embodiments of the invention includes a method of operating an RFID tag, the method comprising receiving energy sufficient to power the RFID tag through an RF antenna included in the RFID tag, reading a state from state memory, sending an RF response through the RF antenna if the read state is an ON state, and disabling the RF response through the RF antenna if the read state is an OFF state.

Various embodiments of the invention includes a method of operating an RFID tag, the method comprising receiving energy sufficient to power the RFID tag through an RF antenna included in the RFID tag, reading a state from state memory, sending an RF response through the RF antenna only if the read state is an ON state.

Various embodiments of the invention includes a multilayer identity document comprising a first outer layer, an electrical conductor configured to conduct a current, a spacer layer including an opening configured to contain a switch activator, the switch activator configured to make and break an electrical connection to the electrical connector, and an inner layer disposed such that the spacer layer and switch activator are between the first outer layer and the second outer layer, the inner layer being configured to be pressed to activate the switch activator.

Various embodiments of the invention includes a switchable RFID tag comprising an antenna configured to receive an RF transmission, an integrated circuit configured to generate a response transmission, and a switch configured to turn on and off the ability of the integrated circuit to generate the response transmission, the switch being disposed such that it is surrounded by the antenna.

Various embodiments of the invention includes a system comprising a plurality of switches configured for a user to enter data, logic configured to transmit a first wireless signal responsive to the entered data, and a circuit configured to receive energy from a received second wireless signal and to power the logic and the transmission of the system using the received energy.

Various embodiments of the invention includes a system comprising logic configured to transmit a first wireless signal in response to a received second wireless signal, a wireless I/O configured to receive the second wireless signal and to transmit the first wireless signal, a memory configured to store an account number, the account number being included in the first wireless signal, a physical contact I/O configured for writing the account number to the memory, logic configured to allow writing of the account number to the memory if the account number is received via the physical contact I/O but if the account number is received via the wireless I/O, and a circuit configured to receive energy from the received second wireless signal and to power the logic and the transmission of the first wireless signal using the received energy.

Various embodiments of the invention includes a system comprising logic configured to transmit a first wireless signal in response to a received second wireless signal, a wireless I/O configured to receive the second wireless signal and to transmit the first wireless signal, the second wireless signal including an identification data associated with a reader, a memory configured to store a log of received identification data received from a plurality of readers, a physical contact I/O configured for uploading the log of received identification data from the memory, logic configured to allow uploading of the log of received identification data from the memory via the physical contact I/O but via the wireless I/O, and a circuit configured to receive energy from the received second wireless signal and to power the logic and the transmission of the first wireless signal using the received energy.

Various embodiments of the invention includes a method comprising mounting a plurality of RFID antenna and RFID tags on a support, mounting a the support on a first side of a spacer, the spacer including opening 140 and optionally including one or more cavity to receive the RFID tags, mounting a cover layer on a second side of the spacer, and cutting the support and spacer to generate a plurality of RFID enabled financial Cards.

Various embodiments of the invention include a method comprising mounting an RFID antenna and RFID tag on a support, mounting a spacer on the support, the spacer being compliant (soft) so that the RFID tag can enter a plane of the spacer to form a cavity, allowing the spacer to harden, and mounting a cover layer on the spacer.

Various embodiments of the invention include a method of assembling an identity device, the method comprising depositing an integrated circuit, antenna and switch contacts on a support layer, and laminating the support layer, spacer and flexible membrane together, the spacer having a cavity in which the integrated circuit fits.

Various embodiments of the invention include a method of assembling an identity device, the method comprising depositing an integrated circuit, antenna and switch contacts on a support layer 150, depositing spacer 120 on the support layer, spacer 120 covering the integrated circuit, and depositing a flexible membrane on the support layer, the flexible membrane or the support layer optionally including an image of a user. The Spacer is optionally configured to create a hermetic seal around the integrated circuit and/or the RFID antenna.

Various embodiments of the invention include a method comprising programming data to non-volatile memory of an RFID tag in a programmable mode, and changing a state of a switch coupled to the RFID tag so as to change the RFID tag from the programmable mode to a non-programmable mode.

Various embodiments of the invention include an RFID tag comprising an antenna configured to transmit data, a power circuit configured to provide power, an integrated circuit configured to receive power from the power circuit, to provide the data to the antenna, the integrated circuit including a non-volatile memory configured to store the data and a logic circuit configured to determine a state of a switch, the switch being configured to control whether the volatile memory can or cannot be programmed.

Various embodiments of the invention include an integrated circuit comprising a first logic input configured for determining a state of a switch, a power input configured to receive power from a radio frequency antenna, the received power being sufficient for powering the integrated and transmitting a data output signal via the radio frequency antenna, and a data output configured for generating the data output responsive to the state of the switch as determined by the first logic input.

Various embodiments of the invention include an Identity Device comprising an RFID antenna configured to receive power from and communicate with an RFID reader, a circuit configured to receive power from the RFID Antenna, a tag configured to be powered by power received through the RFID antenna and to generate a signal for transmission between the RFID antenna and the RFID reader, and a switch configured to repeatedly turn on and turn off detectability or readability of the tag.

Various embodiments of the invention include a locking mechanism comprising a RFID tag activation circuit configured to turn on a switchable RFID tag by operating a switch within the switchable RFID tag, an RFID reader configured to read the switchable RFID tag, and a lock configured to open responsive to the RFID reader.

Various embodiments of the invention include a method of operating an RFID tag, the method comprising activating a switch in order to turn on the detectability or readability of the RFID tag, the RFID tag powered by power received through an RFID antenna, and activating the switch in order to turn off the detectability or readability of the RFID tag.

Various embodiments of the invention include a method of operating a switchable RFID tag, the method comprising operating a switch to turn the RFID tag on, responsive to a first action of a user, receiving a signal at an RFID antenna, collecting power from the signal, using the collected power to power an integrated circuit, collecting data from the signal, processing the collected data using the integrated circuit, transmitting a signal generated by the integrated circuit in response to the collected data, using the RFID antenna, and operating the switch to turn the RFID tag off, responsive to a second action of a user.

Various embodiments of the invention include a switchable RFID tag comprising an RFID antenna configured to receive power from and communicate with an RFID reader, a tag configured to be powered by power received through the RFID antenna and to generate a signal for transmission between the RFID antenna and the RFID reader, and a switch configured to repeatedly turn on and turn off detectability or readability of the tag.

Various embodiments of the invention include a method of controlling an electronic device, the method comprising receiving a wireless RF signal from an RF transmitter, converting the received RF signal into electronic power, generating a wireless return signal using the electronic power, the wireless return signal configured to control the electronic device, placing a switch in a first position to turn on the generation of the wireless return signal, placing the switch in a second position to turn off the generation of the wireless return signal, and returning the switch to the first position to turn on the generation of the wireless return signal.

Various embodiments of the invention include a method of controlling an electronic device, the method comprising receiving a wireless RF signal from an RF transmitter; converting the received RF signal into electronic power; repeatedly changing a switch from a first position to a second position; and generating a wireless return signal using the electronic power, the wireless return signal configured to control the electronic device and being responsive to whether the switch is in the first position and the second position.1

Various embodiments of the invention include a A system comprising an antenna configured to receive a wireless RF signal from an RF transmitter, a power circuit configured to convert the RF signal into electronic power, a circuit configured to receive the electronic power and to send a wireless response signal in response to the RF signal, and a first switch configured to repeatedly turn on and off a first operation of the circuit under control of a user.

Various embodiments of the invention include a method of receiving control instructions, the method comprising, generating a wireless RF signal, transmitting the wireless RF signal to a RF powered remote control device configured to send a wireless return signal responsive to the states of one or more switches, the return signal being generated and transmitted using power converted from the wireless RF signal, receiving the return signal, and determining the states of the one or more switches using the received return signal.

Various embodiments of the invention include a system comprising a RF transmitter configured to send a wireless RF signal, a controlled device, a RF powered remote control configured to be powered by the wireless RF signal and to send a wireless response signal to the controlled device responsive to a first switch, the first switch configured to be repeatedly turned on and off by a user.

Various embodiments of the invention include a method of operating an RFID tag, the method comprising receiving energy sufficient to power the RFID tag through an RF antenna included in the RFID tag, reading a state from state memory, and sending an RF response through the RF antenna unless the read state is an OFF state.

Various embodiments of the invention include a method of operating an RFID tag, the method comprising receiving energy sufficient to power the RFID tag through an RF antenna included in the RFID tag, reading a state from state memory, sending an RF response through the RF antenna if the read state is an ON state, and disabling the RF response through the RF antenna if the read state is an OFF state.

Various embodiments of the invention include a method of operating an RFID tag, the method comprising receiving energy sufficient to power the RFID tag through an RF antenna included in the RFID tag, reading a state from state memory, sending an RF response through the RF antenna only if the read state is an ON state.

Various embodiments of the invention include a security system comprising a security device including a passive RFID circuit configured to generate a first signal and a second signal, the first signal being responsive to removal of the security device from an article and the second signal being different from the first signal. These embodiments also comprise an anti-tamper sensor configured to detect the first RF signal, and an anti-theft sensor configured to detect the second RF signal. In some of these embodiments the circuit includes a conductor configured to be broken when the security device is removed from an article.

Various embodiments of the invention include a method comprising removing an RFID tag from an article, detecting the removal of the RFID tag from the article by detecting a change in state of the RFID tag, recording a sale of the article, and associating the removal of the RFID tag with the sale of the article. Some of these embodiments further comprise logging the presence of the article in inventory using the passive RFID tag. Other embodiments further comprise recording an identity of a person who removed the RFID tag from the article. Still other embodiments further comprise determining if the RFID tag was removed at a point of sale location or an unauthorized location. Removing the RFID tag from the article, in some embodiments, optionally includes making or breaking an electrical connection.

DETAILED DESCRIPTION

FIG. 1 is a block diagram of a Switchable RFID Device 100. In some embodiments, Switchable RFID Device 100 is an identity device such as a passport, identity card, driver's license, immigration document (e.g., green card or visa), student identity card, library card, financial card (e.g., credit card, debit card or prepaid card), social security card, Military ID card, key, keycard or the like. Switchable RFID Device 100 optionally includes Visible Indications 120 such as a barcode, picture, image, name, address, text, and/or the like. Switchable RFID Device 100 further includes one or more Switchable RFID Tag 130. Switchable RFID Tag 130 includes one or more RFID Antenna 140, a Circuit 150, one or more Tag 160 and one or more Switch 170. Switch 170 is optionally disposed within Circuit 150 or Tag 160. RFID Antenna 140 is configured for sending a radio frequency (RF) signal from Switchable RFID Device 100 in response to a received signal. The received signal is optionally used to power Switchable RFID Tag 130. In some embodiments, the received signal is an RF signal received by RFID Antenna 140. In alternative embodiments, the received signal is received through an inductive coupling or a non-RF antenna within Circuit 150. RFID Antenna 140 is optionally a dipole antenna.

In some embodiments, Switchable RFID Tag 130 is configured for a user to be able to repeatedly turn on and off the function (e.g., delectability or readability) of Tag 160 using Switch 170. Circuit 150 typically further includes a diode, capacitor, transistor, and/or the like configured to receive power through RFID Antenna 140 or an inductive coupling and to convey signals between RFID Antenna 140 and Tag 160. In some embodiments, Tag 160 includes an integrated circuit.

Switchable RFID Tag 130 is differentiated from circuits found in RFID tags of the prior art by at least the inclusion of Switch 170. Switch 170 is optical, thermal, magnetic, mechanical, wireless, and/or electronic. Switch 170 is configured to be activated by a magnetic field, an electric field, a wireless signal, light, heat, mechanical force, and/or an electronic circuit external to Switchable RFID Device 100. Switch 170 is optionally a sliding switch, a flip switch, a rotating switch, membrane switch, pushbutton switch, or other mechanical switch known in the art of mechanical switches. In typical embodiments, Switch 170 is configured for both turning on and turning off function of Tag 160.

In various embodiments, Switch 170 is normally open or normally closed, and the function of Tag 160 can be normally on or normally off. For example, In some embodiments, Switch 170 is a mechanical contact switch activated by applying pressure to an outside surface of Switchable RFID Device 100. In some embodiments, when this pressure is applied the functionality of Tag 160 will be turned on, and when this pressure is not applied the functionality of Tag 160 will be off. In some embodiments, Switch 170 is a mechanical contact switch activated using a magnetic field. In some embodiments, Switch 170 is an electrical switch turned on or off by a circuit external to Switchable RFID Device 100. For example, Switch 170 may include two electrical contacts exposed at the exterior of Switchable RFID Tag 130. When a conductance path, current and/or voltage is applied between these electrical contacts Switch 170 is turned on, or in alternative embodiments, turned off.

In various embodiments, Switch 170 functions by creating a short circuit. For example, Switch 170 can be configured to turn off the function of Tag 160 by short circuiting RFID Antenna 140, a diode within Circuit 150, a capacitor within Circuit 150, a transistor within Circuit 150, and/or a connection within Tag 160.

In various embodiments, Switch 170 functions by creating an open circuit. For example, Switch 170 can be configured to create an open circuit between (or within) RFID antenna 140, Circuit 150, and/or Tag 160.

In some embodiments, Switchable RFID Device 100 is configured to operate as a key and Switch 170 is activated to turn on the functions of Tag 160 by mechanical insertion of the key into a locking device. In these embodiments, the functions of Tag 160 are typically off when the key is not inserted in the locking device. The locking device is configured to activate Switch 170 using an electronic circuit, a mechanical force, or a magnetic field.

In alternative embodiments, an instance of Switch 170 is included in Tag 160 and/or Circuit 150. Thus, Switchable RFID Tag 130 may include a plurality of Switch 170, one Switch 170 in Circuit 150 and one Switch 170 in Tag 160. As is described further herein, these instances of Switch 170 may be configured to perform different functions.

FIG. 2 illustrates some of many possible locations for Switch 170 within Switchable RFID Device 100 where Switch 170 creates an open circuit. FIG. 3 illustrates some of man possible locations for Switch 170 within Switchable RFID Device 100 wherein Switch 170 creates a short circuit. The embodiments illustrated by FIGS. 2 and 3 include a Transistor 210, a Diode 220, and a Capacitor 230. Possible positions for Switch 170 are indicated by an "X."

In some embodiments, Switch 170 is configured to partially limit the functionality of Tag 160. Thus, Tag 160 may be configured to respond with data indicating a first state when Switch 170 is on and to respond with data indicating a second state when Switch 170 is off. For example, Switch 170 can be connected to logic circuits of Tag 160 in such a way that Tag 160 will transmit a limited amount of data when Switch 170 is off and a less limited amount of data when Switch 170 is on. For example, Tag 160 may be configured to respond with data indicating the name of a person when Switch 170 is off and to respond with the data including the name, an address, an account number and a telephone number when Switch 170 is on. When Switch 170 is connected to a circuit within Tag 160, Switch 170 (or a plurality thereof) is optionally configured to separately control detection of and readability of Tag 160. Detection occurs when Tag 160 sends any response signal, while readability is a function of the data that may be included in the contents of the response signal.

FIGS. 4A and 4B illustrate one embodiment of Switchable RFID Device 100 in which Switch 170 is a sliding switch disposed along an Edge 420 of Switchable RFID Device 100. FIG. 4A illustrates an OFF Position wherein an Electrical Connector 410 between Circuit 150 and Tag 160 is in an open circuit state. In this state, Tag 160 is not normally detectable or readable. FIG. 4B illustrates an ON position wherein Switch 170 completes an electrical connection between Circuit 150 and Tag 160. In this position, Tag 160 is detectable and readable. In this embodiment, Switch 170 is configured to be moved between the on position and the off position, for example using a finger. In the on position, Switch 170 optionally extends from Edge 420 of Switchable RFID Device 100. In the off position, Switch 170 is optionally approximately flush with Edge 420. Some embodiments of the invention include a switch configured to be approximately flush with an edge of a financial card (e.g., credit card or debit card) in at least one position. Some embodiments of the invention include a switch configured to be below an edge of a financial card in at least one position. Switch 170 may be bistable or astable. Other features illustrated in FIGS. 4A and 4B are optional.

FIGS. 5A and 5B illustrates a Membrane Switch, generally designated 500, (and surrounding area) for use in a switchable RFID device such as Switchable RFID Device 100. Membrane Switch 500 is optionally an embodiment of Switch 170. Membrane Switch 500 is shown in the OFF and ON positions, in FIGS. 5A and 5B respectively. The use of a finger to operate Membrane Switch 500 is optional, other devices may be used to activate the switch. By bringing electrical conductors on a Surface 530 and a Surface 525 together, a switchable RFID tag is controlled, activated or deactivated. Typically, Surface 525 and Surface 530 are coated with an electrical conductor, such as copper. In some embodiments, a Support Layer 510 is disposed at a First Surface 515 of Switchable RFID Device 100 and a Flexible Membrane 520 is disposed at a Second Surface 535 of Switchable RFID Device 100. Thus, the Flexible Membrane 520 includes both Surface 525 and an outer surface, e.g., Surface 535 of Switchable RFID Device 100. In some embodiments, Surface 535 extends beyond Membrane Switch 500 to Surrounding Areas 550. As such Flexible Membrane 520 is essentially flush with a surface of Switchable RFID Device 100. Flexible membrane 520 and Support Layer are separated by a Spacer 540. In some embodiments, Spacer 540 extends beyond the immediate vicinity if Membrane Switch 500 to Surrounding Areas 550. Spacer 540 optionally extends essentially throughout Switchable RFID Device 100. As such, Surface 535 can be essentially smooth, e.g. does not include raised portions near Membrane Switch 500. Support Layer 510 is typically stiffer than Flexible Membrane 520.

In various embodiments, Membrane Switch 500 is included in an identity device such as a passport, driver's license, immigration card, key card, financial card, ID card, or the like. For example, In some embodiments, Membrane Switch 500 is included within a passport or other identity device having a clamshell configuration. In these embodiments, Flexible Membrane 520 is optionally disposed toward an interior of the identity device when the identity device is closed. In this position, Flexible Membrane 520 is protected from inadvertent contact and typically can only be pressed after the identity device is opened.

In various embodiments, Membrane Switch 500 is included in a financial card (e.g., a credit card, debit card or the like). In some of these embodiments, Flexible membrane 520 is essentially flush with Surrounding Areas 550 of the financial card including Surface 525, as illustrated in FIGS. 5A and 5B. In this position Membrane Switch 500 does not substantially stick out from First Surface 525 of the financial card and is, thus, protected by Surrounding Areas 550 from inadvertent activation. In some embodiments, Membrane Switch 500 is recessed below First Surface 535.

FIG. 5C illustrates an embodiment of Membrane Switch 500 further including a Spring 555. Spring 555 may be considered a switch activator. Spring has an activation height at which the spring center will spring into contact with the Support Layer 510 this activation height is typically below First Surface 535.

Figure 5D:
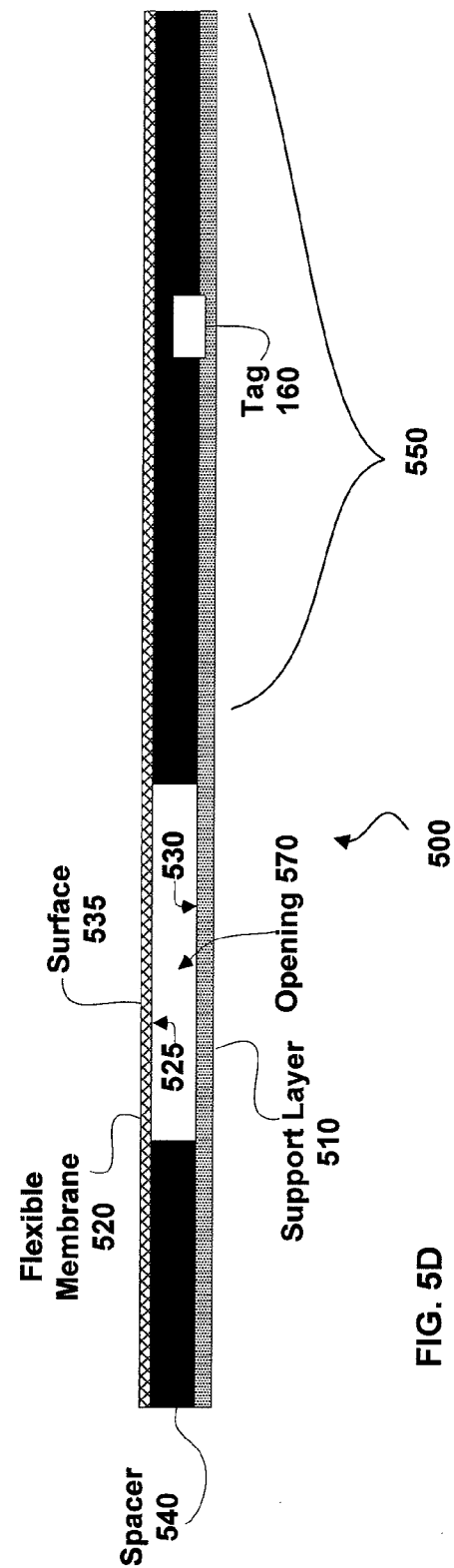
FIG. 5D illustrates a cross-sectional view of a membrane switch disposed within a switchable RFID Tag, according to various embodiments of the invention.

FIG. 5D illustrates a cross-sectional view of Membrane Switch 500 disposed within Switchable RFID Tag 130. Tag 160 is at least partially disposed within Spacer 540 and/or Support Layer 510. Spacer 540 and/or Support Layer 510 optionally include a cavity configured to receive Tag 160. In some embodiments, Tag 160 is deposited on Support Layer 510 before Spacer 540 is deposited on Support Layer 540. In these embodiments, Support Layer 540 is formed around Tag 160. In some embodiments, Spacer 540 is configured to hermetically seal Tag 160 and/or Membrane Switch 500.

In various embodiments, an Opening 570 within Membrane Switch 500 is less than or equal to 2.0 mm, 1.5 mm, 1.75 mm, 1.25 mm, 1.0 mm, 0.75 mm, or 0.5 mm think as measured from Surface 525 to Surface 530.

The membrane switch illustrated in FIGS. 5A and 5C is optionally disposed such that Flexible Membrane 520 is approximately flush with, or recessed in, First Surface 535 of an identity device such as a driver's license or credit card. As such, Spacer 540 prevents the membrane switch from being activated when a force is applied to the entire first surface. For example, when the identity device is placed within a wallet and the wallet is compressed.

Spacer 540 optionally extends essentially throughout an identity device. For example, where Switchable RFID Device 100 is a credit card, Spacer 540 may extend to the outer edges of the credit card. Flexible Membrane 520 optionally includes a picture of a user and/or an indication of the location of Opening 570 in Spacer 540. In some embodiments, Flexible Membrane 520 is transparent and Spacer 540 includes a picture of a user or a credit card number. In some embodiments, Spacer 540 includes a cavity configured to fit an integrated circuit, the integrated circuit configured to operate as part of Tag 160 and optionally mounted on Support Layer 540. In some embodiments, Support Layer 540 includes conductive traces configured to connect Tag 160 to an RFID Antenna 140. In some embodiments, Spacer 540 is generally rectangular in shape, (e.g., in the shape of a financial card).

FIG. 6 illustrates a top view of Membrane Switch 500 of FIG. 5C, according to various embodiments of the invention. In these embodiments, the shape of the Opening 570 is configured to prevent Spring 555 from rotating. A wide variety of alternative shapes may be used in alternative embodiments.

Figure 7:
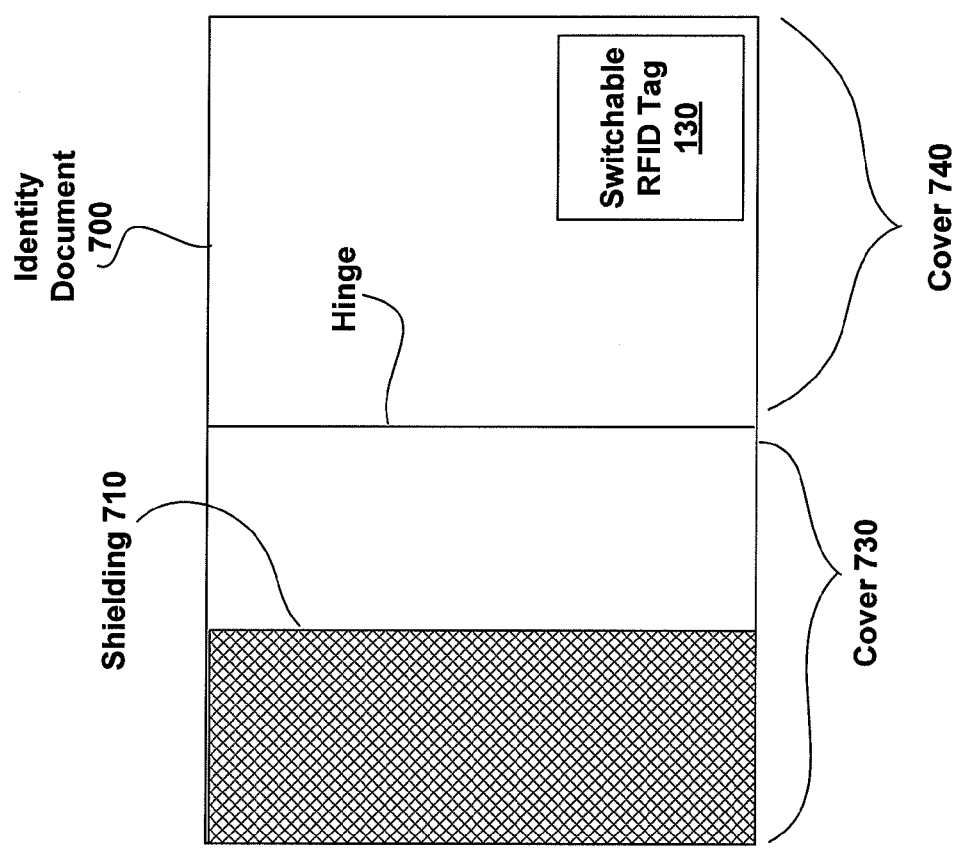
FIG. 7 illustrates a switchable RFID tag in an identity document, according to various embodiments of the invention.

FIG. 7 illustrates Switchable RFID Tag 130 in an embodiment wherein Switchable RFID Device 100 includes an Identity Document 700 having a clamshell configuration (e.g., a passport). Switchable RFID Tag 130 may be included in a Cover 740, a Cover 730, or an interior page (not shown) of Identity Document 700. Identity Document 700 optionally includes Shielding 710. Flexible Membrane 520 is typically disposed such that it is on the interior of Identity Document 700 when Identity Document 700 is closed. See U.S. nonprovisional patent application Ser. No. 11/350,309 filed Feb. 7, 2006 for further details of Identity Document 700, according to some embodiments.

Figure 8:
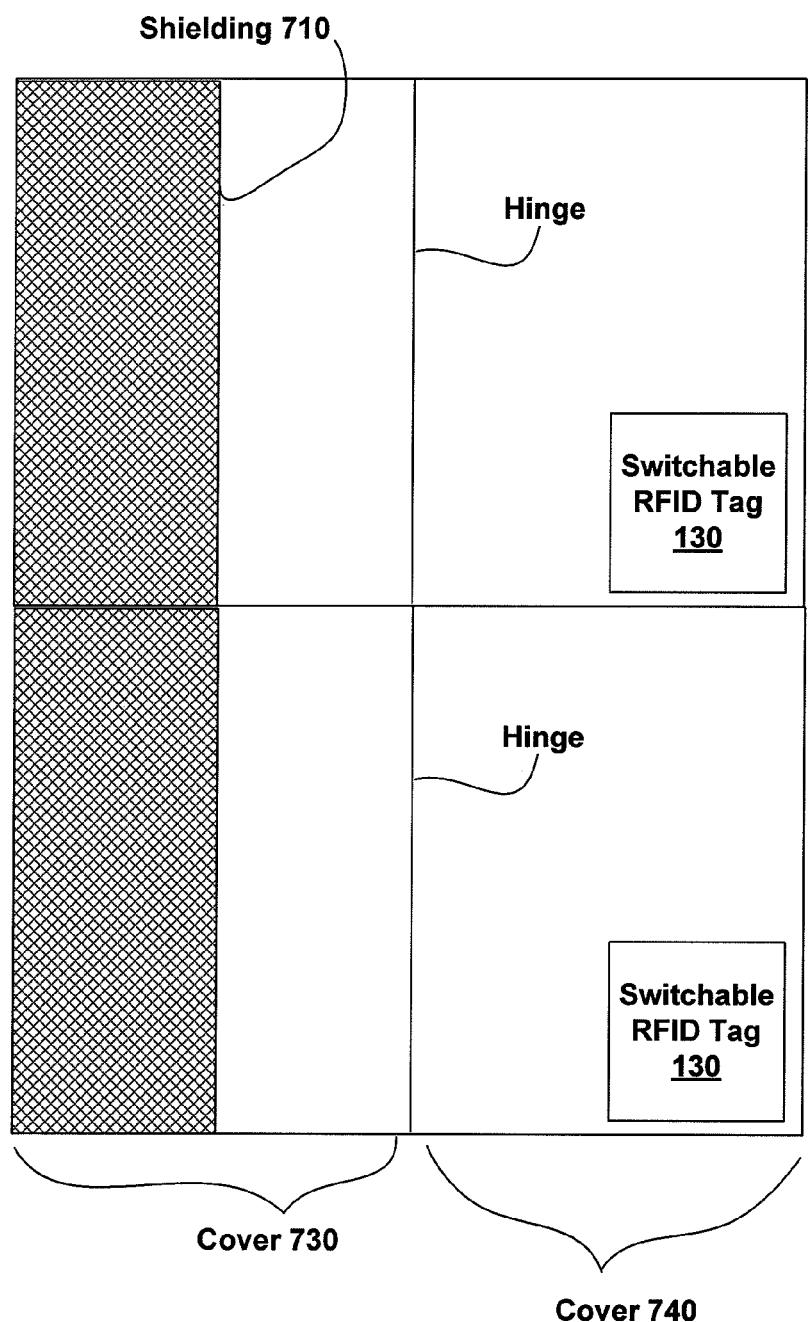
FIG. 8 illustrates the manufacture of instances of an identity document, according to various embodiments of the invention.

FIG. 8 illustrates the manufacture of instances of Identity Document 700. At one stage in the manufacturing process, Shielding 710 is dispensed in the form of a strip. The strip is laid down over what will be several separate instances of Identity Document 700 (after when the manufacturing is completed). A plurality of Switchable RFID Tag 130 are deposited, creating a device including several Switchable RFID Tag 130. The assembled material, including Shielding 710 is optionally cut to separate the locations where the instances of Switchable RFID tag 130 are deposited or to be deposited. As a result a plurality of Identity Document 700 are produced. Pages are optionally added to the assembled material prior to cutting. See U.S. nonprovisional patent application Ser. No. 11/350,309 filed Feb. 7, 2006 for further details, according to some embodiments.

In the above and other embodiments, Switchable RFID Tag 130 is optionally disposed such that the switch mechanism is accessed from the inside of Cover 730 or Cover 740, the inside being the sides that face each other when Identity Document 700 is closed. This orientation is optionally configured to reduce the probability of inadvertently activating Switch 170 when Identity Document 700 is closed. For example, in these embodiments, Flexible membrane 510 may be to the inside (of the closed Identity Document 700) and Support Layer 510 may be to the outside. Support Layer 510 optionally includes a stiffener in the region near Opening 570.

Figure 9:
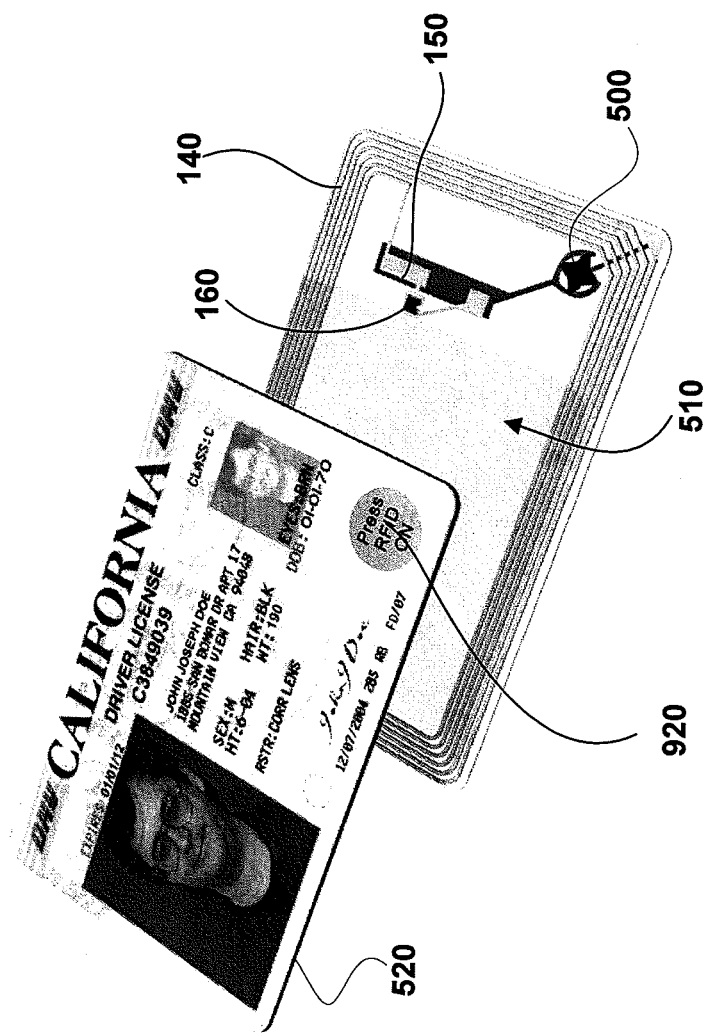
FIG. 9 illustrates an exploded view of an embodiment of a switchable RFID device including a driver's license, according to various embodiments of the invention.

FIG. 9 illustrates an exploded view of an embodiment of Switchable RFID Device 100 including a Driver's License, generally designated 900. In this view, for clarity, Spacer 540 is removed and Flexible Membrane 520 is separated from Tag 160, RFID Antenna 140, Circuit 150 and Support Layer 510. A location of Membrane Switch 500 is indicated by Markings 920 visible at Flexible Membrane 520. Surface 535 is of uniform level across the face of Driver's License 900. As such, Switchable RFID Device 100 can smoothly be placed in a wallet and Membrane Switch 500 is protected from inadvertent activation by Spacer 540. Membrane Switch 500 is optionally disposed at least partially within RFID Antenna 140. A similar embodiment of Switchable RFID Device 100 may include a credit card or similar financial device.

Figure 10:
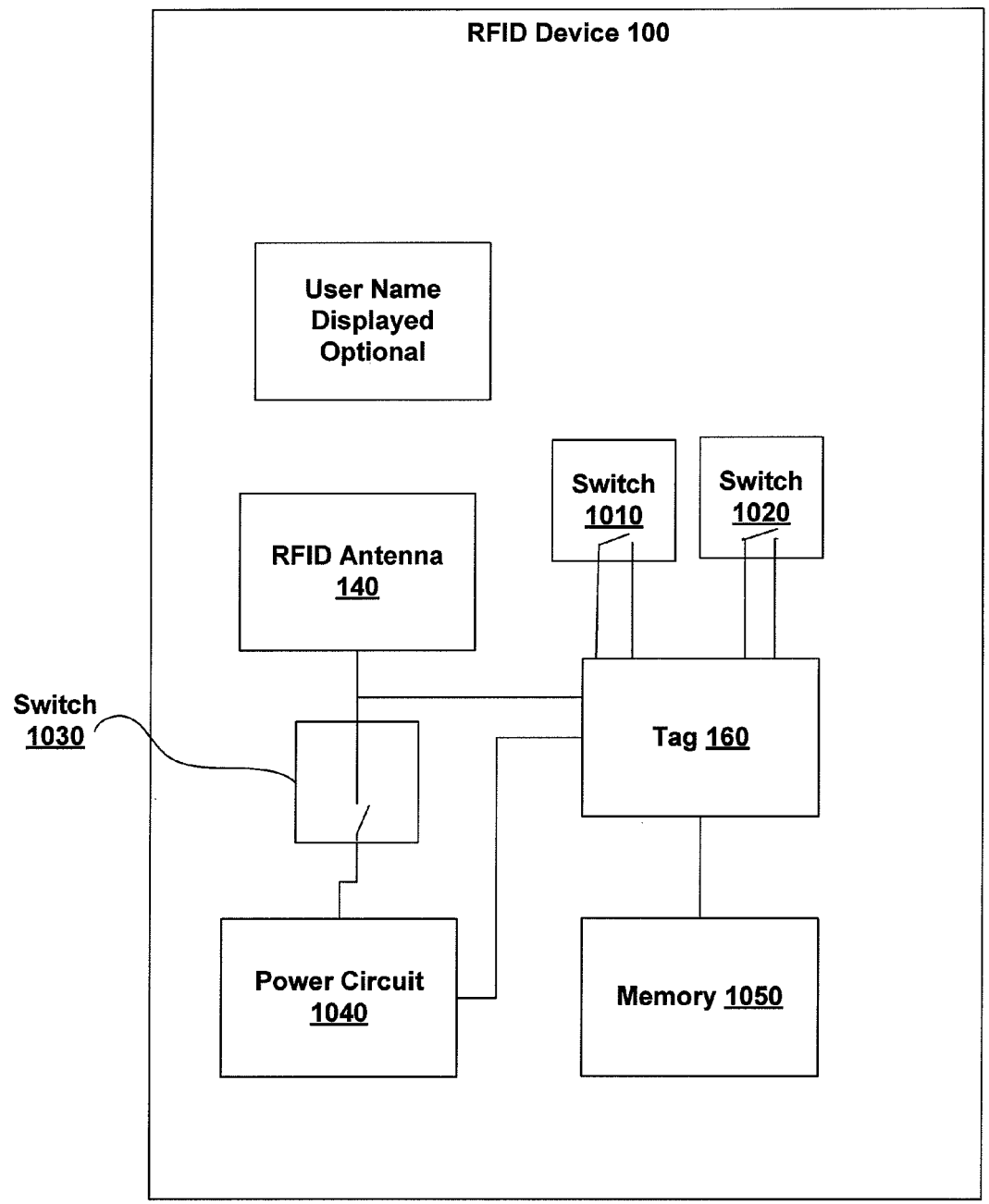
FIG. 10 illustrates an embodiment of a switchable RFID Device including a plurality of switches, according to various embodiments of the invention.

FIG. 10 illustrates an embodiment of Switchable RFID Device 100 including a plurality of Switches, designated 1010, 1020 and 1030. These embodiments of Switchable RFID Device 100 may include an identity device, financial device, credit card, debit card, remote control, product label, communication device, or the like. Any of Switches 1010, 1020, and 1030 are optional. Switch 1030 is configured for turning Switchable RFID Device 100 ON and OFF. For example, as illustrated, Switch 1030 may be disposed in a connection between RFID Antenna 140 and a Power Circuit 1040. Power Circuit 1040 is an embodiment of Circuit 150 configured to generate electrical power from a received signal to power Tag 160.

Switch 1010 and Switch 1020 are configured to control processing logic within Tag 160. For example, in some embodiments, Switch 1010 and Switch 1020 are configured to provide Boolean (true/false) values to a logic circuit within Tag 160. Some embodiments include further switches (e.g., 3, 4, 6, 8, 10 or more) configured to control processing logic.

In various embodiments, the processing logic within Tag 160 can be configured to perform a wide variety of functions responsive to Switch 1010, Switch 1020, and any additional switches present. For example, in some embodiments, the processing logic is configured such that when Switch 1010 is activated a transaction amount is approved and when Switch 1020 is activated the transaction amount is disapproved. Alternatively, Switch 1010 and Switch 10 may be part of a set of switches used to enter a PIN (personal identification number), an encryption key, an amount, an authorization code, an RFID reader identification number, an identification number associated with Switchable RFID Device 100, a selection of a mode of Tag 160, text, numbers, and/or other data.

In some embodiments, data sent by Tag 160 using RFID Antenna 140 is responsive to Switch 1010 and/or Switch 1020. For example, in some embodiments, Tag 160 will send a different identification number depending on whether Switch 1010 or Switch 1020 is activated. In some embodiments, Tag 160 is configured to allow a transaction up to a certain value if neither Switch 1010 nor Switch 1020 is activated, and progressively higher values if Switch 1010 or Switch 1020 is activated. In some embodiments, Tag 160 is configured to require that Switch 1010 and Switch 1020 be activated in a specific combination, order and/or with a specific temporal pattern in order to perform some operation, e.g., a financial transaction.

While the embodiment of Switchable RFID Device 100 illustrated in FIG. 10 includes one instance of Tag 160, as discussed elsewhere herein, Switchable RFID Device 100 optionally includes more than one instance of Tag 160. When more that one instance of Tag 160 is present, a separate instance of Switch 1030 may be disposed between RFID Antenna 140 (or Circuit 150) and each instance of Tag 160. In this configuration, the instances of Switch 1030 may be used to select which instance of Tag 160 to activate. Switch 1010 and/or Switch 1020 may, likewise, be configured to select, activate or control different instances of Tag 160.

In some embodiments, Switchable RFID Device 100 includes a Memory 1050. Memory 1050 is optionally programmable. For example, in some embodiments, Memory 1050 is programmable using data entered through instances of Switch 1010 and Switch 1020. In some embodiments, Memory 1050 is changed from a write state to a read only state, using Switch 1010. In various embodiments, Memory 1050 is configured to store data to be broadcast, encryption information, data keys, values to be used in conjunction with data entered suing Switch 1010, data for logic processing, identifying data, account data, mode data characterizing a mode of Switchable RFID Tag 130, or the like. Memory 1050 can be volatile or non-volatile, FLASH, SDRAM, ROM, DDRAM, DRAM, or the like. Some embodiments of the invention include an automated device configured to actuate Switch 170 in order to place Switchable RFID Tag 130 in a programmable mode.

Figure 11:
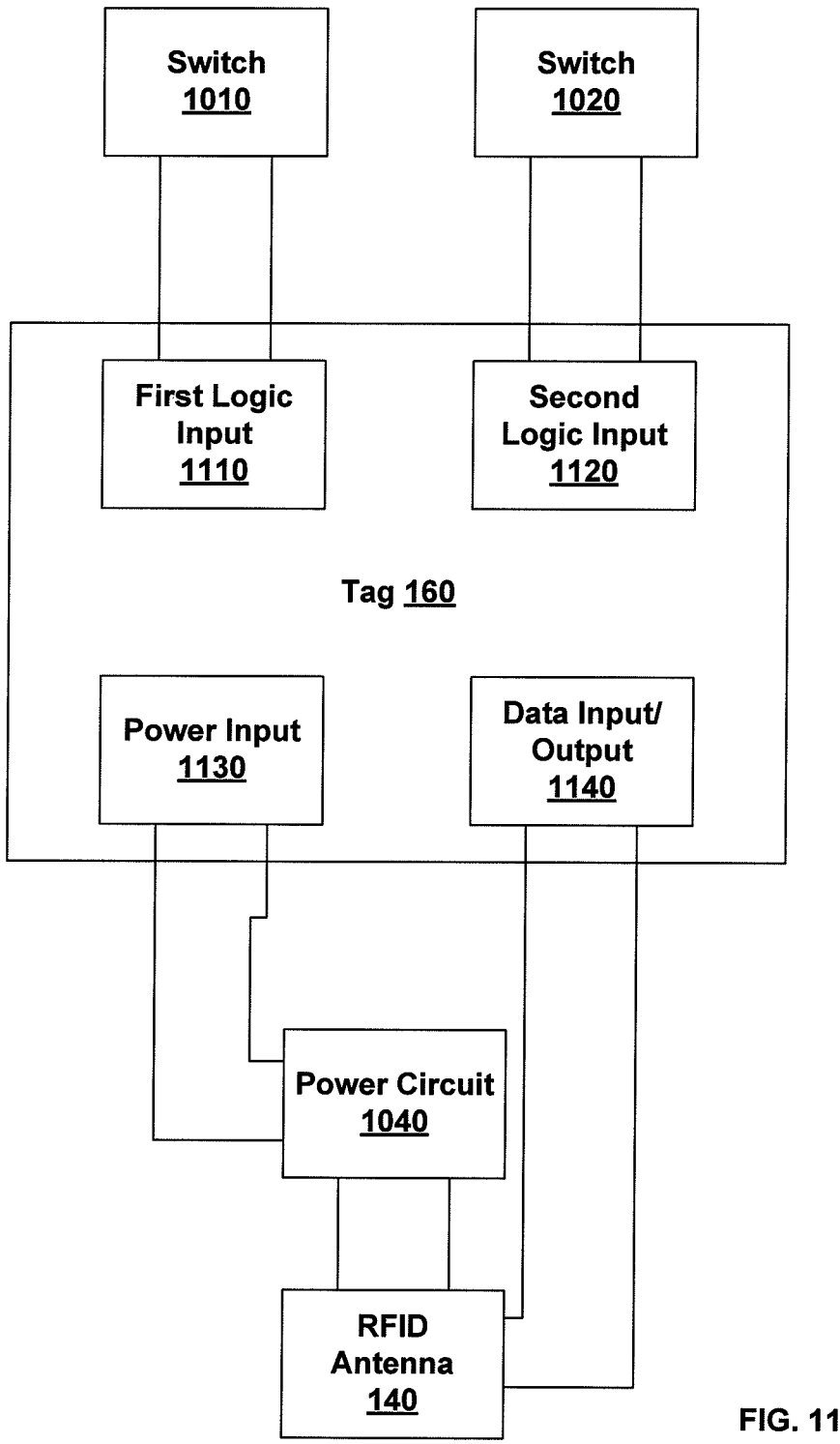
FIG. 11 illustrates various embodiments of an tag configured for use in embodiments of a switchable RFID device including a plurality of switches, according to various embodiments of the invention.

FIG. 11 illustrates various embodiments of Tag 160 configured for use in embodiments of Switchable RFID Device 100 including a plurality of switches. In the illustrated embodiments, Tag 160 includes a First Logic Input 1110 and an optional Second Logic Input 1120, configured to be coupled to Switch 1010 and Switch 1020, respectively. First Logic Input 1110 and Second Logic Input 1120 are each configured to be responsive to a different switch. First Logic Input 1110 and Second Logic Input 1120 are configured to control the function of Tag 160.

For example, in some embodiments, Tag 160 is configured to output different data via a Data Input/Output 1140 depending on the state of Switch 1010 as determined by the First Logic Input 1110. Tag 160 is optionally configured to output different data depending on whether a switch coupled to First Logic Input 1110 or a switch coupled to Second Logic Input 1120 is activated.

In some embodiments, the switches illustrated in FIG. 11 are membrane switches. In some embodiments, the switches illustrated in FIG. 11 are irreversible switches.

Figure 12:
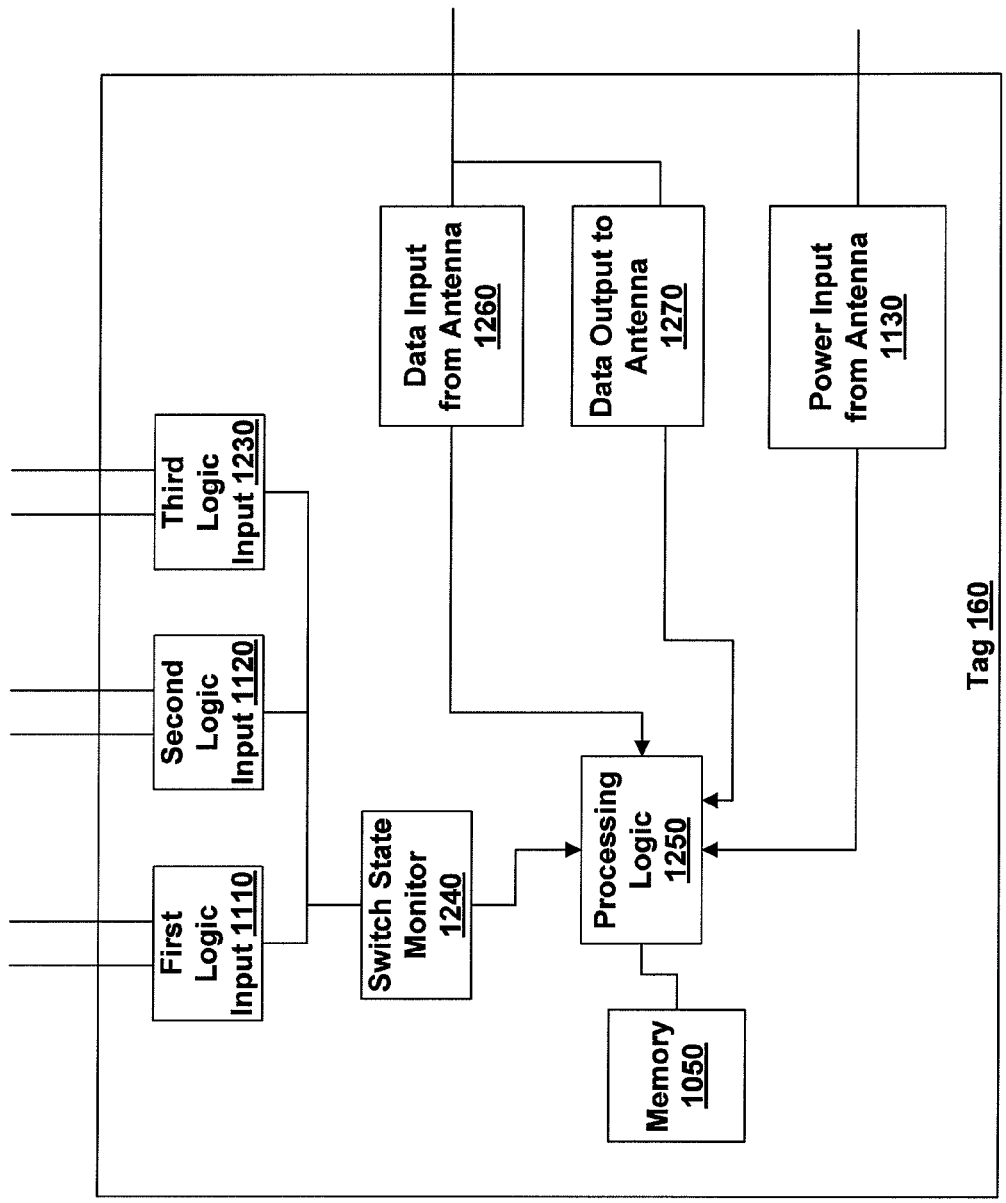
FIG. 12 illustrates an instance of a tag, according to various embodiments of the invention.

FIG. 12 illustrates an instance of Tag 160, according to various embodiments of the invention. These embodiments include a plurality (e.g., 2, 3, 4, 8, 10, 12 or more) of switch inputs, such as First Logic Input 1110, Second Logic Input 1120 and Third Logic Input 1230. First Logic Input 1110, Second Logic Input 1120 and Third Logic Input 1230 are configured to receive inputs from Switch 1010, Switch 1020, Switch 1030, or the like, respectively. The state of connected switches (Switch 1010, Switch 1020, etc.) is monitored by an optional Switch State Monitor 1240 and a Processing Logic 1250. Switch State Monitor 1240 is optionally a multiplexer, latch, logic circuit, or the like.

In some embodiments, Processing Logic 1250 is configured to process data received through a Data Input From Antenna 1260, to receive power from a Power Input From Antenna 1130, and to generate data for output through a Data Output to Antenna 1270 responsive to the states of Switch 1010, Switch 1030, etc. The generated data is optionally further responsive to data stored in Memory 1050 and/or data received from Data Input from Antenna 1260.

The data received from Memory 1050 can include codes required for Processing Logic 1250 to generate specific data for communication through Data Output to Antenna 1270. For example, in some embodiments, Tag 160 is configured to output an RF signal only if data in Memory 1050 matches a state of Switches 1010 and 1020. In some embodiments, the state of switches is used to determine which of several different alternative RF signals to transmit. For example, if Switch 1010 is activated then a first signal is transmitted, if Switch 1020 is activated then a second signal is transmitted, and if no switches are depressed than no signal is transmitted or an third signal is transmitted. The first and second signals are optionally associated with different financial accounts and/or different functions.

Some embodiments of the invention include a multi-switch credit card including one or more instances of Tag 160. This multiswitch credit card optionally is configured to be associated with more than one financial account and switches may be used to indicate which of the more than one financial account should be used for a transaction. In one example, the multiswitch credit card includes an instance of Tag 160 configured for engaging in a financial transaction responsive to Switch 1010 and also configured to operate an electronic lock responsive to Switch 1020.

Some embodiments of the invention optionally include programming of Tag 160 to make associations with the one or more financial account. This programming can include entering data within Memory 1050. Alternatively, Tag 160 is configured to include a plurality of exchangeable Memory 1050. In these embodiments, Tag 160 is programmed to operate with different financial accounts and/or functions by inserting different instances of Memory 1050 within Switchable RFID Tag 130. The multiswitch credit card is, thus, optionally a multi account credit card.

Some embodiments of Switchable RFID Device 100 are configured to include a plurality of Tag 160. Each member of the plurality of Tag 160 may be responsive to one or more switches. In some embodiments, Switchable RFID Device 100 is configured to receive one or more replaceable instances of Tag 160. In these embodiments, Switchable RFID Device 100 may be programmed by replacing an instance of Tag 160. Multiple instances of Tag 160 optionally share one instance of RFID Antenna 140 and/or one instance of Memory 1050.

Figure 13:
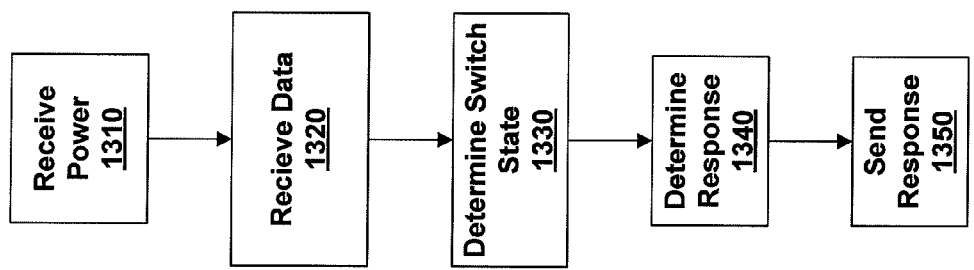
FIG. 13 illustrates a method according to various embodiments of the invention, according to various embodiments of the invention.

FIG. 13 illustrates a method according to various embodiments of the invention. In these embodiments, power is received by Tag 160 through an RF or inductive signal in a Receive Power Step 1310. The RF signal optionally includes data received in a Receive Data Step 1320. The state of one or more of Switches 1010, Switch 1020, etc. is then determined in a Determine Switch State 1330 Step. This state is used to determine an RF response, of any, in a Determine Response Step 1340. The RF response is then sent in a Send Response Step 1350.

Figure 14:
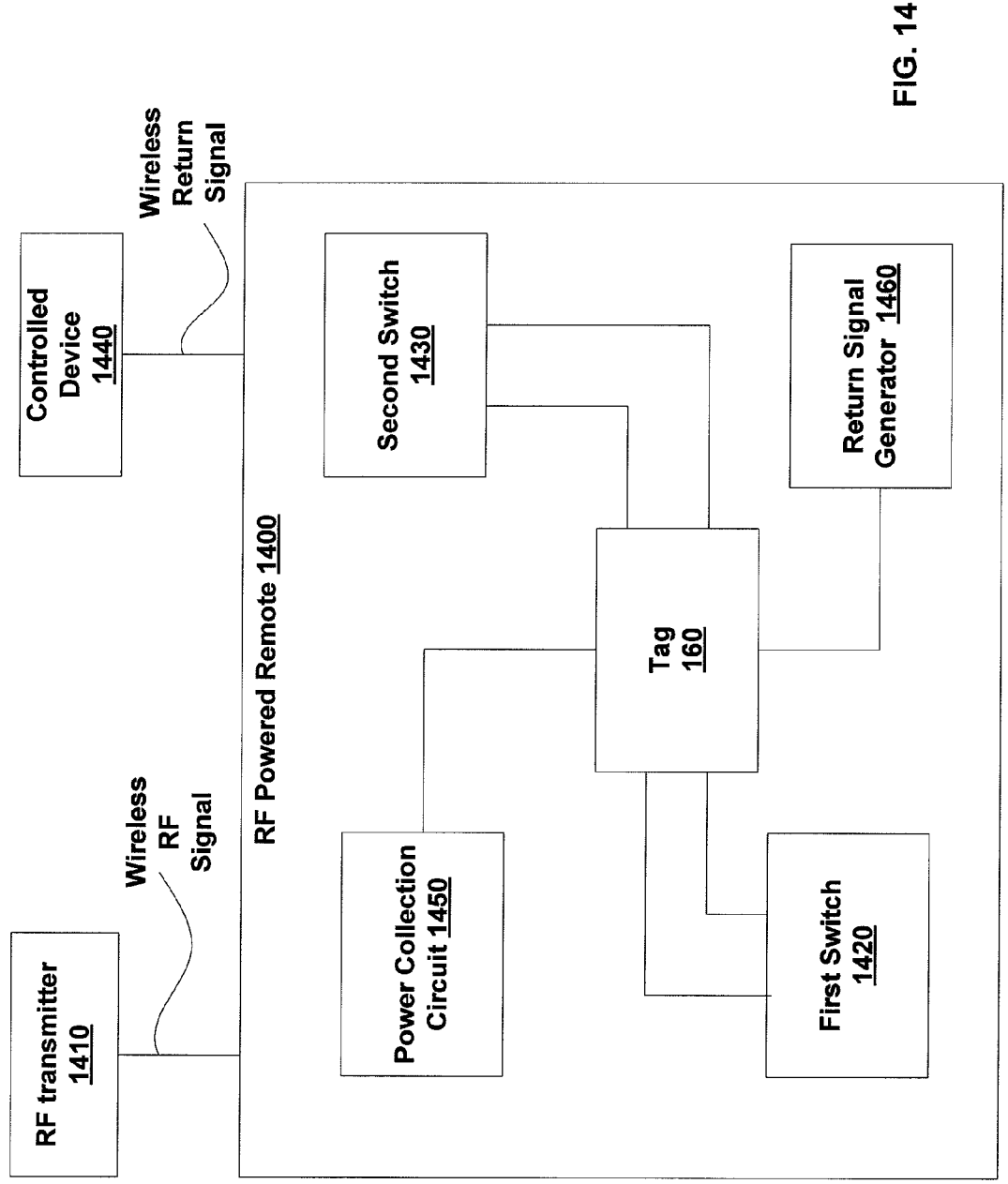
FIG. 14 illustrates a switchable RFID device configured to operate as a remote control, according to various embodiments of the invention.

FIG. 14 illustrates various embodiments of the invention in which Switchable RFID Device 100 is configured as a RF Powered Remote 1400 configured to control external devices. This RF Powered Remote 1400 optionally does not require an internal power source (e.g., is powered wirelessly). Power is received from an RF (radio frequency) signal via RFID Antenna 140 and used to send a return signal, typically through the same instance of RFID Antenna 140. RF Powered Remote 1400 uses one or more Switchable RFID Tag 130 to activate and deactivate or modify the return signal. The one or more Switchable RFID Tag 130 optionally share RFID Antenna 140, power circuits, and/or processing logic. RF Powered Remote 1400 is typically a multifunction remote control.

RF Powered Remote 1400 is optionally used as part of a locking mechanism, such as in a vehicle lock or door lock. RF Powered Remote 1400 is optionally configured to control electronic equipment, such as a computing device, a video recording device, projector, a game, a stereo, or a television. RF Powered Remote 1400 is optionally configured to control a garage door opener.

As illustrated in FIG. 14, a Transmitter 1410 is configured to send an RF signal to provide power to RF Powered Remote 1400. This RF signal is received by RF Powered Remote 1400. When a switch (e.g. a First Switch 1420 or a Second Switch 1430), included in RF Powered Remote 1400, is in a first position the received power is used to send a return signal from RF Powered Remote 1400 to the device being controlled, e.g. a Controlled Device 1440. Transmitter 1410 is optionally included in Controlled Device 1440. When First Switch 1420 and/or Second Switch 1430 is in a second position the received power is not used to send the return signal from the remote, or is used to send a different return signal. The return signal may include audio, RF, infrared light, visible light, or the like. First Switch 1420 and Second Switch 1430 are optionally embodiments of Switch 1010, Switch 1020, or Switch 1030. In various embodiments, RF Powered Remote 1400 includes 1, 2, 3, 4 or more switches, such as First Switch 1420 and Second Switch 1430. Typically, different switches are configured to control different functions of Controlled Device 1440.

In some embodiments, First Switch 1420 and/or Second Switch 1430 are configured to control the collection of power from the RF signal. In some embodiments, First Switch 1420 and/or Second Switch 1430 are configured to prevent the power from flowing through an integrated circuit within the RF Powered Remote 1400. In some embodiments, the First Switch 1420 and/or Second Switch 1430 are configured to decouple an instance of RFID Antenna 140 within RF Powered Remote 1400. In some embodiments, the First Switch 1420 and/or Second Switch 1430 are configured to prevent data transmission from RF Powered Remote 1400. In some embodiments, First Switch 1420 and/or Second Switch 1430 are configured to control logic within an instance of Tag 160 within RF Powered Remote 1400. In various embodiments, First Switch 1420 and/or Second Switch 1430 are normally on or normally off. In some embodiments, more than one switch is configured to control logic within the same integrated circuit.

The embodiments of RF Powered Remote 1400 illustrated in FIG. 14 include a Power Collection Circuit 1450 configured to convert the received RF signal to electrical power of the operation of one or more Tag 160. RF Powered Remote 1400 is configured to power an integrated circuit, e.g., Tag 160, and send a return signal using the electrical power produced by Power Collection Circuit 1450. The RF Powered Remote optionally receives all of its electrical power from the Power Collection Circuit 1450.

Depending on the state of Switch 1420 and/or Switch 1430, Tag 160 may cause the return signal to be transmitted using a Return Signal Generator 1460. Return Signal Generator 1460 is optionally included in Tag 160. Return Signal Generator 1460 is optionally shared by a plurality of Tag 160 within RF Powered Remote 1400. In some embodiments, Return Signal Generator 1460 includes an instance of RFID Antenna 140.

First Switch 1420 and Second Switch 1430 each control Tag 160, such that the return signal is responsive to the states of these, and optionally further, switches. For example, in some embodiments, if First Switch 1420 is on, then Tag 160 will include a first data in the return signal, and if Second Switch 1430 is on, then Tag 160 will include a second (typically different) data in the return signal.

The RF Transmitter 1410 and Controlled Device 1440 are optionally separate. For example, the RF transmitter may be included in an automobile and the controlled device may be a garage door.

In some embodiments, First Switch 1420 is activated by insertion of RF Powered Remote 1400 in part of a locking system.

In some embodiments, First Switch 1420 is coupled to a button configured for turning the volume of an electronic device up and/or Second Switch 1430 is coupled to a different button configured for changing a channel.

In some embodiments, RF Powered Remote 1400 is configured to unlock a car.

In various embodiments, RF Powered Remote 1400 includes a wireless keypad, a wireless computer mouse, a wireless keyboard, a wireless microphone, a key, a telephone, an identity document, or the like.

In some embodiments, RF Powered Remote 1400 is included in a hermetically sealed and/or waterproof housing. Because the RF powered remote is remotely powered, there is no necessity for a battery compartment or power plug.

First Switch 1420 and Second Switch 1430 may include a push-button switch, a membrane switch, a sliding switch, a magnetic switch, or any of the many other switches known in the art to make and break electrical connections. First Switch 1420 is optionally part of a roller, wheel or dial that makes and breaks an electrical connection as it is turned. First Switch 1420 and Second Switch 1430 are optionally embodiments of Switch 170.

In some embodiments, a single instance of RF Transmitter 1420 is configured to power a plurality of Tag 160. Each of this plurality of Tag 160 is optionally configured to control a separate electronic device or operate different functions in a single electronic device. The plurality Tags 160 optionally included in the same RF Powered Remote 1400.

In some illustrative embodiments, an instance of RF Transmitter 1410 is disposed within a vehicle dashboard and a plurality of Tag 160 are disposed within a steering wheel of the vehicle or rear view mirror. One of the plurality Tag 160 is configured to control an audio system and another of the plurality of switchable RFID tags is configured to control a climate system (e.g., air conditioner or heating). In some embodiments, the wireless response signals generated by both of these Tag 160 is received by a RF receiver and communicated to a circuit that then controls the separate electronic devices. In alternative embodiments, each of the separate electronic devices (e.g., audio system and climate system) includes a separate RF receiver configured to receive the response signals.

FIG. 15 illustrates an embodiment of Switchable RFID Device 100 including a Multiswitch Credit Card 1500, according to various embodiments of the invention. Multiswitch Credit Card 1500 includes two or more switches, such as Switch 1510, Switch 1511, and optional Switch 1512. Switches 1510, 1511 and 1512 are optionally embodiments of Switch 1010 and Switch 1020. Multiswitch Credit Card 1500 further includes one or more instances of Tag 160, an optional instance of Circuit 150 configured to generate power for used by Tag 160, and RFID Antenna 140. In embodiments without Circuit 150, Multiswitch Credit Card 1500 includes its own power source (not shown).

Switches 1510-1512 are each configured to make or break an electrical connection, the state of which can be determined by the resistance of electric current flow or the presence of a current or voltage. In some embodiments, Switches 1510-1512 are membrane switches, such as Membrane Switch 500. In various embodiments, Multiswitch Credit Card 1500 including Switches 1510-1512 is less than 4, 3, 2, 1.5, 1, or 0.5 mm thick. In various embodiments, Switches 1510-1512 are essentially flush with a front surface of Multiswitch Credit Card 1500.

In some embodiments, Circuit 150 is configured to generate electrical power from the RF signal received via RFID Antenna 140 for use by one or more instances of Tag 160. In some embodiments, Circuit 150 and/or RFID Antenna 140 are shared by several instances of Tag 160 within Multiswitch Credit Card 1500. In some embodiments, Multiswitch Credit Card 1500 is configured not to transmit an RF signal unless at least one of Switches 1510-1512 is activated. In some embodiments, Switches 1510-1512 are configured for entering an access code, such as PIN or password. The access code is optionally encoded by an order in which the states of switches are changed, by a switch combination, and/or by a temporal relationship between changes in switch state, e.g., a temporal pattern.

In some embodiments, Switches 1510-1512 are configured for approving the amount of a financial transaction. In some embodiments, Switches 1510-1512 are configured for selecting from among a plurality of financial accounts. For example, activating Switch 1510 may result in a transaction being debited from a checking account, activating Switch 1511 may result in a transaction being applied a first charge account, and activating Switch 1512 may result in a transaction being applied to a second charge account.

In some embodiments, Multiswitch Credit Card 1500 (or other embodiments of Switchable RFID Tag 100) includes encryption logic configured to operate in response to the activation of switches. For example, the encryption logic may be configured to use data received via switches as an encryption or decryption key. The encryption logic may be configured to encrypt data received via switches prior to transmission of this data. In some embodiments, Switchable RFID Tag 100 is configured to make use of rolling codes for security purposes. In these embodiments, synchronization of the codes is optionally be coordinated by a central server configured to communicate with point of sale stations. In some embodiments, a switch is activated using a biometric sensor. The features described herein with respect to various embodiments of Switchable RFID Tag 100, such as Multiswitch Credit Card 1500, may be included in other types of identity devices.

In various embodiments of the invention, an identity device includes both one or more electrical contact configured to make physical electrical contact with a reader and a RFID tag configured to communicate wirelessly with a reader. The physical contact is optionally used to convey communication that is different from the wireless communication. For example, the physical connection based communication may include programming of a circuit within the RFID tag (e.g., programming account number), while the wireless communication may be more limited than the physical connection based programming, (e.g., the wireless communication may be limited to reading the programmed account number). In another example, the wireless communication may be configured for a limited set of transaction types (e.g., those less than $50, or deposits), while the physical communication is configured for additional transaction types (e.g., larger value withdrawals). Further, the physical communication may be used for downloading transaction logs or other data stored on the ID card. Transaction logs are optionally stored using power received through RFID Antenna 140.

In various embodiments, an identity device includes a plurality of switches and is configured to engage in a transaction or allow access (to an account, data, or a physical location) responsive to whether proper members of the plurality of switches are pressed. For example, in one embodiment the ID card includes 10 switches configured for a user to enter a PIN (personal identification number) or password. Only when the proper data is entered using the plurality of switches will the ID card participate in certain functions, such as an electronic payment or opening of a lock. As described further herein, different numbers of switches are possible.

In various embodiments, an identity device includes logic configured to process data entered using a plurality of switches. This logic may, for example, prevent the identity device from transmitting an RF signal unless the entered data matches previously stored data, for example, if an entered PIN matches a stored access code. The logic may be responsive to the order of switches activated, combinations of switch activation (e.g., which switches are activated at the same time), or which of the plurality of switches are activated. Timing may be achieved through the use of appropriate RC (resister-capacitor) circuits or a clock signal.

Various embodiments of the invention include a modified version of Basic Access Control. In these embodiments, the logic is configured to prevent the identity device from transmitting certain data unless the data entered using switches on the identity device matches an ID number of a RFID reader making a request. The logic may be configured to implement Basic Access Control, such as that used in electronic U.S. passports, but unlike the system used in current passports, the data entered is an ID of the reader and the data is entered at the passport (or other identity device) rather than at the reader.

In various embodiments, the identity device includes a plurality of switches configured for a user to enter data associated with a reader. For example, In some embodiments, the switches are configured to receive an ID number of a point of sale (POS) device. Logic within the identity device may then use this ID number to assure that a transaction is communicated to the correct POS device. For example, if several vending devices are positioned adjacent to each other, the ID number of one of the vending devices may be entered in the identity device using the plurality of switches and the ID card may then be enabled to engage in a transaction with that particular vending device but not the other nearby vending devices.

Passwords, PINs, or the like received by the identity device through the plurality of switches are optionally stored in volatile memory within the identity device. When the identity device ceases to receive energy through an RF signal the data stored in this volatile memory is discarded (lost). In some embodiments, this data is stored in non-volatile memory and thus retained between RF transmissions.

In some embodiments, the identity device is configured to store an account balance in static memory. Logic within the identity device is optionally configured such that the account balance can only be increased using a physical connection, while the account balance can be debited using a wireless connection. Alternatively, logic within the identity device is optionally configured such that the account balance can only be debited using a physical connection.

Some embodiments of the invention include methods of purchasing using a switchable RFID. The identity device is placed within the reading range of a wireless POS device. One of a plurality of switches within identity device is activated such that an RFID tag will respond to an RF signal from the POS device. The RFID tag responses to the RF signal from the POS by energizing itself using the RF signal and generating a response RF signal. The responsive RF signal includes an account number such as a checking or savings account number, a credit card number, identity number, or the like, responsive to the switch.

FIGS. 16A-16C illustrate positions of RFID Antenna 140 within Multiswitch Credit Card 1500, according to various embodiments of the invention. As illustrated in FIG. 16A, in some embodiments, RFID Antenna 140 is disposed such that Embossed Lettering or Numbering 1520 is inside of RFID Antenna 140. In these embodiments, at least part of Switch 170 (or a plurality thereof) is optionally disposed inside of RFID Antenna 140. As illustrated in FIGS. 16B and 16C, in some embodiments, RFID Antenna 140 is disposed primarily in the part of a credit card (e.g., the upper half) that does not include Embossed Lettering or Numbering 1520. In these embodiments, Switch 170 (or a plurality thereof) may be disposed either inside and/or out side of RFID Antenna 140. As illustrated in FIG. 16C, when Switch 170 is disposed outside of RFID Antenna, Connections 1510 between Switch 170 and Tag 160 are optionally routed to avoid Embossed Lettering or Numbering 1520. In some embodiments, Spacer 540 is comprised of a material that can be embossed to form raised lettering and numbering (e.g., a name and credit card number). In these embodiments, the manufacture of Embossed Lettering or Numbering 1520 can be made through Spacer 540.

In some embodiments, of the invention, one or more instances of Switch 170 are configured to control whether Tag 160 (and/or associated memory) are in a programmable state or a non-programmable state. For example, when an instance of Switch 170 is in a first state writing to non-volatile memory within Tag 160 is allowed and when Switch 170 is in a second state writing to the non-volatile memory is not allowed but reading of the non-volatile memory may be allowed. In some embodiments, Switch 170 is initially in a state wherein the non-volatile memory can be written to and the switch is then irreversible changed to a state wherein the non-volatile memory can no longer be written to.

Figure 17:
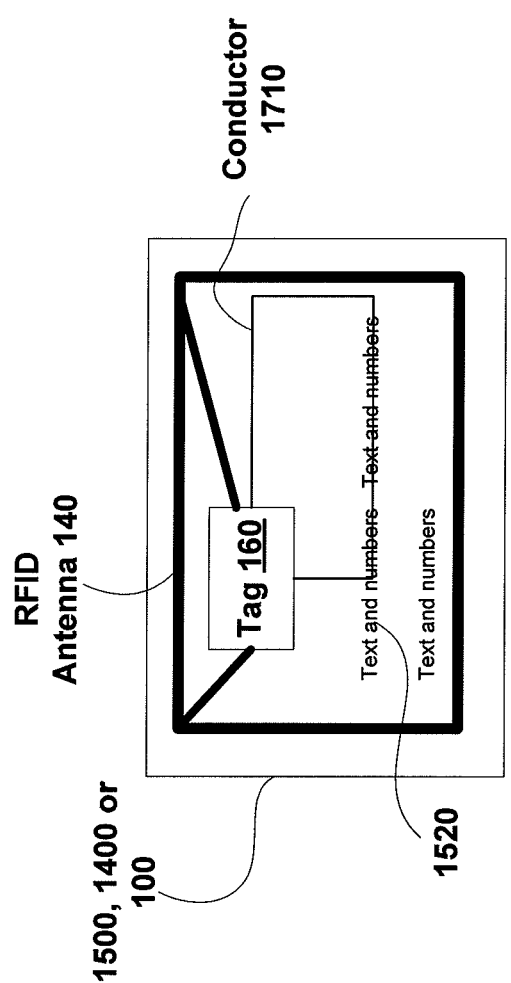
FIG. 17 illustrates an RFID device including a conductor configured to set a state of an RFID tag, according to various embodiments of the invention.

The irreversible change optionally includes breaking of a conductor. For example, in some embodiments, an RFID enabled identity device is configured such that an instance of Switch 170 comprises a Conductor 1710 coupled to Tag 160. As illustrated in FIG. 17, when Conductor 1710 is unbroken Tag 160 is in a programmable state, e.g., non-volatile memory within Switchable RFID Tag 130 can be written to. After programming this conductor is broken and Tag 160 is thus irreversibly changed to a nonprogrammable state. Data already programmed within Switchable RFID Tag 130 may be locked by the breaking of Conductor 1750. In one embodiment, Conductor 1710 is broken through the manufacture of Embossed Lettering or Numbering 1520. For example, embossing a credit card number into a credit card can break a conductor and thus lock the contents of non-volatile memory within the credit card. In alternative embodiments, an identity device includes a plurality of Conductor 1710 and members of this plurality are broken in order to program function of Tag 160. Each member of the plurality of Conductor 1710 that is or is not broken represents one bit of logic programmed.

Some embodiments of the invention include a switchable RFID tag is configured to be remotely switched using an RF signal. In some embodiments, in an OFF state, the RFID tag will not transmit a response signal and thus is not remotely detectable using an RF signal. In an ON state, the RFID tag will transmit a response signal The RFID tag is switched between the ON state and the OFF state through receipt of a specific command or commands, through an RF signal. In alternative embodiments, the RFID tag includes multiple ON states, optionally in combination with an OFF state.

Figure 18:
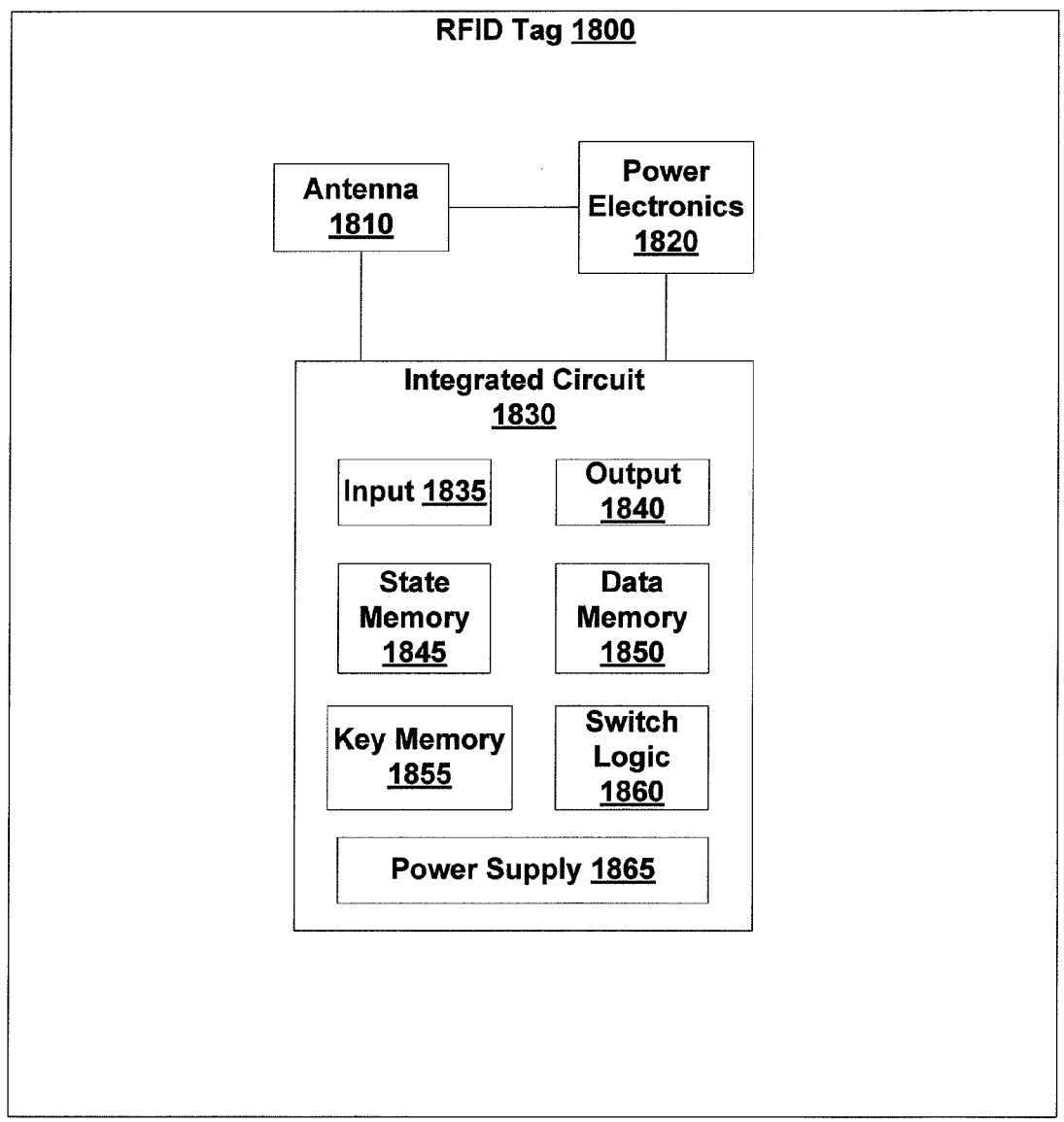
FIG. 18 is a block diagram illustrating an RFID tag, according to various embodiments of the invention.

FIG. 18 illustrates a remotely switchable RFID Tag 1800 including an Antenna 1810, a Power Electronics 1820, and an Integrated Circuit 1830. RFID Tag 1800 is optionally an embodiment of other RFID tags disclosed herein. Likewise, Antenna 1810, Power Electronics 1820 and Integrated Circuit 1830 are optionally embodiments of other antennae, power electronics and integrated circuits disclosed herein. Antenna 1810 is configured to send and receive data encoded in an RF signal and also optionally configured to receive sufficient energy to power RFID Tag 1800.

Power Electronics 1820 are configured to receive energy through Antenna 1810 and to power Integrated Circuit 1830 using this received energy. Power Electronics 1820 typically include elements such as a diode, capacitor, transistor, or the like.

Integrated Circuit 1830 includes an Input 1835 configured to receive data from Antenna 1810 and power from Power Electronics 1820. Integrated Circuit 1830 further includes an Output 1840 configured to convey data to Antenna 1810 for transmission as an RF signal.

Integrated Circuit 1830 further includes an optional State Memory 1845 configured to store the current state of the RFID Tag, e.g., ON or OFF. In various embodiments, State Memory 1845 includes a memory location in a static random access memory, a magnetic memory, or the like. In these embodiments, the state stored within State Memory 1845 is preserved without a constant source of power. In some embodiments, State Memory 1845 includes memory configured to store data only while power is available. In this embodiment, the ON state is typically temporary and automatically reverts to the OFF state after power is no longer available.

Integrated Circuit 1830 further includes an optional Data Memory 1850 configured to store data received through Antenna 1810, and/or to be transmitted using Antenna 1810. The data stored in Data Memory 1850 may include a serial number of RFID Tag 1800, identification data, biometric data, medical information, license information, or the like.

Integrated Circuit 1830 further includes a Key Memory 1855 configured to store a key required to change the state of the RFID Tag 1800 from ON to OFF, from OFF to ON, and/or between two ON states. Key Memory 1855 is typically static memory, and optionally read only memory or write-once memory. In other embodiments, the Key Memory 1855 is memory configured for temporary storage of data.

Integrated Circuit 130 further includes Switch Logic 1860 configured to read the state stored in State Memory 1845 and, responsive to the read state, either transmit or not transmit an RF signal using Antenna 1810. The transmitted data optionally includes data stored in Data Memory 1850. In some embodiments, Switch Logic 1860 is configured to not transmit an RF signal unless the state read from State Memory 1845 indicates that the RFID Tag is in an ON state. In some embodiments, Switch Logic 1860 is configured to read the state stored in State Memory 1845 and, responsive to the read state, transmit one of a plurality of alternative data stored in Data Memory 1850. In some embodiments, Switch Logic 1860 is configured to read the state stored in State Memory 1845 and, responsive to the read state, transmit different amounts of data stored in Data Memory 1850.

In some embodiments, Switch Logic 1860 is configured to receive data through Antenna 1810, to read a key from Key Memory 1855, to compare the received data with the read key, and to change the state stored in State Memory 1845 responsive to this comparison. For example, in some embodiments, if the read key matches the received data, the state of the RFID Tag 1800 is set to ON, or changed from one ON state to another ON state. In some embodiments, Switch Logic 1860 includes logic configured to decrypt or apply a hash function to the received data prior to the comparison. The Switch Logic 1860 can include software, hardware, and/or firmware. In some embodiments, State Memory 1845 is configured to store a rolling code.

In some embodiments, Integrated Circuit 1830 is embodied in several devices. For example, the functionality of Integrated Circuit 1830 may be distributed among several chips. In some embodiments, Key Memory 1855, Antenna 1810, Switch Logic 1860 and/or State Memory 1845 are configured to be shared by more than one instance of Integrated Circuit 1830. For Example, two or more instances of RFID Tag 1800 may be included in a single device and these two or more instances of RFID Tag 1800 may share a single instance of Key Memory 1855, Antenna 1810, Switch Logic 1860 and/or State Memory 1845.

In some embodiments, RFID Tag 1800 further includes a mechanical switch configured to control operation of RFID Tag 1800. This switch may include, for example, Switch 170 (FIG. 1). For example, in one embodiment, Switch Logic 1860 is configured for turning ON and OFF operation of RFID Tag 1800, while Switch 170 is configured to select between alternative ON states. In an alternative embodiment, Switch 170 is configured for turning ON and OFF operation of RFID Tag 1800 and Switch Logic 1860 is configured for selecting between alternative ON states. In some embodiments, proper activation of both Switch 170 and Switch Logic 1860 is required to turn RFID Tag 1800 to an ON state. Thus, in order for RFID Tag 1800 to transmit certain information, or to transmit at all, Switch 170 must be activated by a person and Switch Logic 1860 must receive a proper key from an RF reader. This provides a dual layer of mechanical and key based security. In some embodiments, the switch must be activated and a proper key must be received in order for RFID Tag 1800 to transmit certain information. In some embodiments, use of Switch 170 will activate RFID Tag 1800 in a first ON state and use of Switch Logic 1860 (through an RF signal) will activate RFID Tag 1800 in a second ON state. The second ON state optionally requires use of both Switch 170 and Switch Logic 1860.

In some embodiments, Integrated Circuit 1830 also includes an independent Power Supply 1865 such as a battery or capattery.

In some embodiments, the switchable RFID Tag 1800 of FIG. 1 is included in an identification document such as a driver's license, green card, passport, or the like. In some embodiments, the Switchable RFID Tag 1800 is included in a wireless key configured to open a lock, to access data, to gain entry, or the like. In some embodiments, Switchable RFID Tag 1800 is included in a cellular telephone or an other device configured to communicate using WiFi, WiMAX, or similar non-RFID standards.

FIG. 2 is a flowchart illustrating a method of changing a state of RFID Tag 1800. In an optional Receive Energy Step 1910, energy sufficient to power RFID Tag 1800 is received by Antenna 1810. Receive Energy Step 1910 is typically similar to Receive Power Step 1310. In a Receive Data Step 1920, data is received by Antenna 1810 in the form of an RF signal. In some embodiments, Receive Data Step 1920 requires that a mechanical switch be activated. In a Read Key Step 1930, a key is read from Key Memory 1855. Optionally, the data received in the Receive Data Step 1920 is decrypted or otherwise processed. In a Compare Step 1940, the read key is compared with the, optionally processed, data received in the Receive Data Step 1920.

In a Change State Step 1950, the state of RFID Tag 1800 is changed responsive to results of the comparison made in the Compare Step 1940. In some embodiments, if there is a match between the key and the data then the state of RFID Tag 1800 is set to ON. Setting the state ON optionally includes writing a value to State Memory 1845. In some embodiments, if there is no match between the key and the data then the state is set to OFF. In some embodiments, if there is a match between the key and the data, then the state is set to one of two or more possible ON states. In one of the two or more possible ON states, RFID Tag 1800 can transmit a response RF signal but the data that can be included in the response RF signal is restricted relative to another of the two or more possible ON states. For example, in one embodiment, in one ON state RFID tag 1800 is configured to include a name in the response RF signal, but another ON state RFID tag 1800 is configured to include the name and medical information in the response RF signal.

In some embodiments, RFID Tag 1800 is automatically returned to the OFF state from the ON state, in a Revert Step. For example, in one embodiment the ON state remains only so long as there is charge on a capacitor. When this charge dissipates or is used, the RFID automatically returns to a default OFF state. The automatic switch back to the OFF state can be dependent on when power is no longer received from an RF signal, on the timing characteristics of an RC (resistor-capacitor) circuit, on Switch 170, on an RF signal received, and/or the like.

Figure 20:
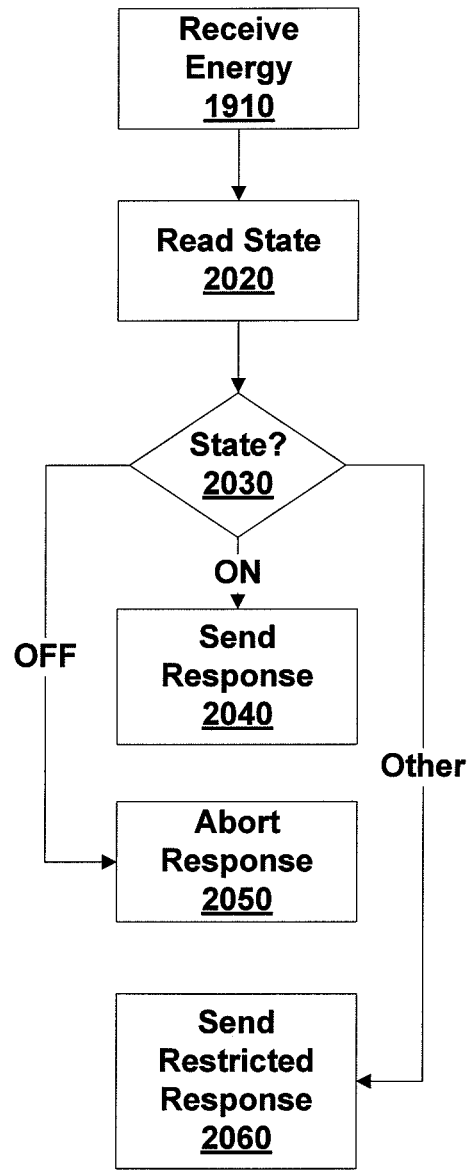
FIG. 20 is a flowchart illustrating a method of operating the RFID tag illustrated in FIG. 1, according to various embodiments of the invention.
Figure 21:
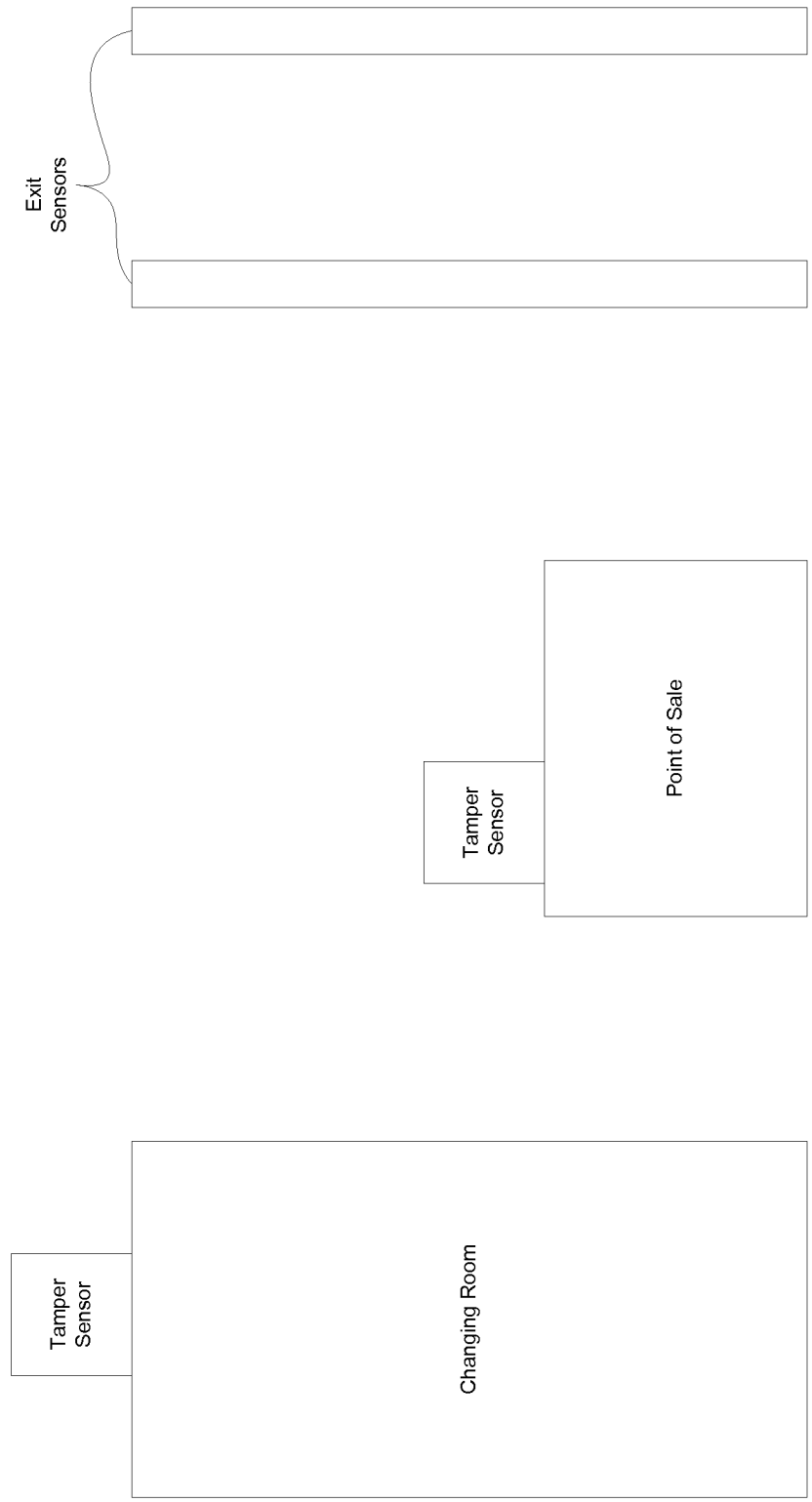
FIG. 21 is block diagram illustrating an environment including exit sensors and RFID security tamper sensors disposed where tampering is possible, according to various embodiments of the invention.
Figure 22:
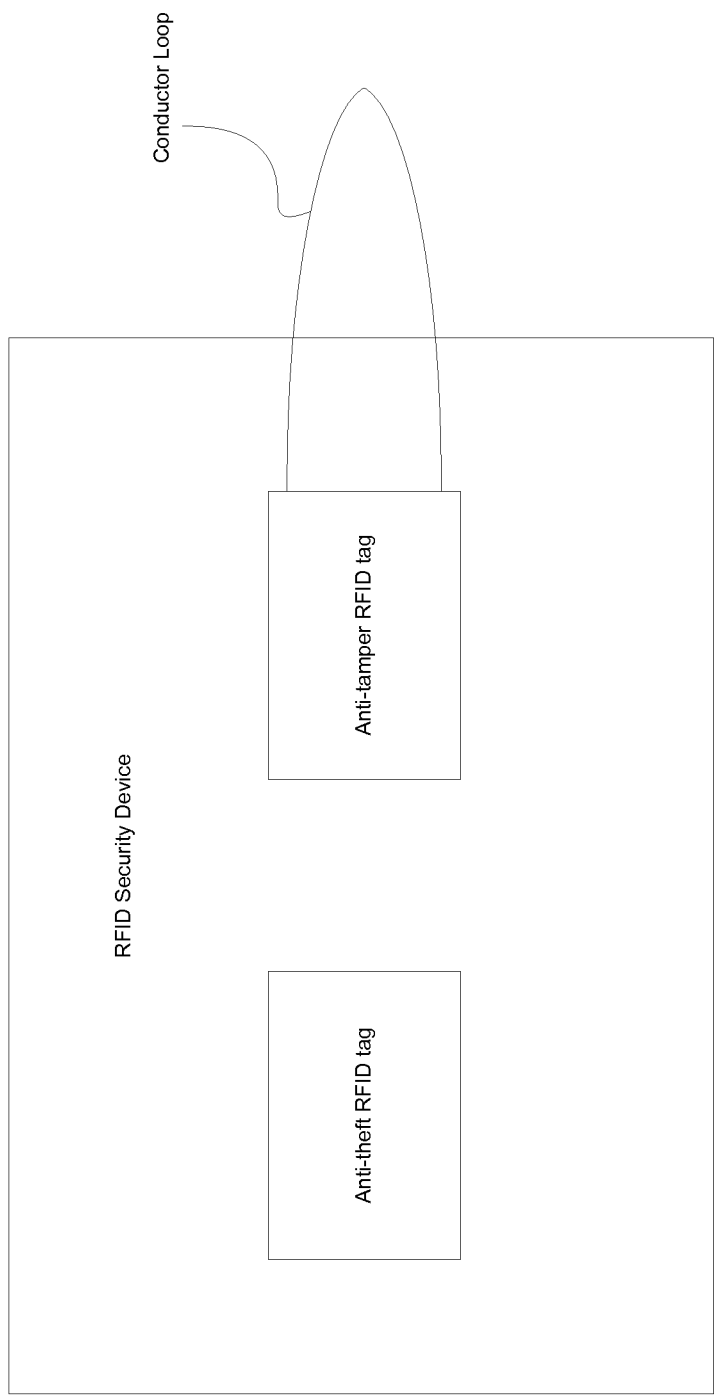
FIG. 22 is a block diagram of an RFID security device, according to various embodiments of the invention.

FIG. 20 is a flowchart illustrating a method of operating the RFID Tag 1800 illustrated in FIG. 18. In an optional Receive Energy Step 1910 energy sufficient to power the RFID is received by Antenna 1810. In a Read State Step 2020 the state of the RFID Tag is read from State Memory 145. In a State? Step 2030 the read state is examined. If the read state is ON, then in a Send Response Step 2040 an RF response is sent from the RFID Tag 1800 using Antenna 1810. If the read state is OFF, then the RFID Tag 1800 is prevented from sending an RF response, in an Abort Response Step 2050. In some embodiments, that include more than two states, the read state can be something other than ON or OFF. If the read state is a state other than ON or OFF then a restricted RF response is sent in a Send Restricted Response Step 2060. The restricted response typically includes less or different data than would be included if the read state had been ON.

Figure 19:
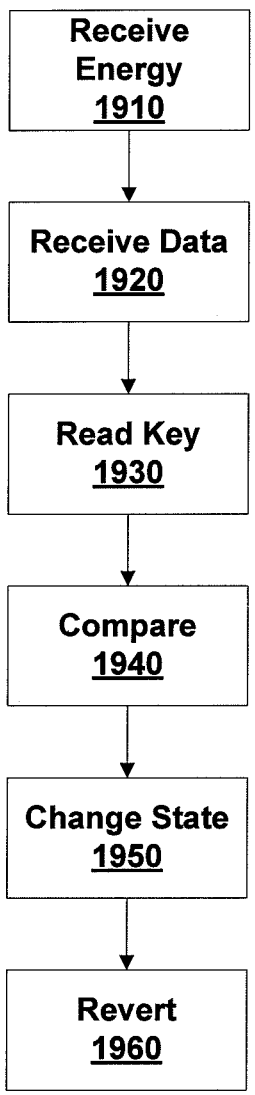
FIG. 19 is a flowchart illustrating a method of changing a state of the RFID tag illustrated in FIG. 1, according to various embodiments of the invention.

The steps shown in FIGS. 19 and 20 are optionally performed using Integrated Circuit 1830 of FIG. 18.

In some embodiments, first data in a transmission is configured to change the state of an RFID tag to ON. Further data in the transmission is then configured to elicit a responding transmission from the RFID tag. After the transmission is concluded the RFID tag automatically reverts to the OFF state. These embodiments optionally include non-volatile memory for storage of the state.

In some embodiments, data in a transmission is configured to change the state of an RFID tag to ON. The ON state persists until the RFID tag receives data configured to change the state of the RFID tag to OFF.

Some embodiments of the invention include RFID security devices including a tamper detection switch. These security devices are configured to function as an RFID device to prevent shoplifting. As such, the RFID security devices include an anti-theft mode configured to be detected by sensors at, for example, an exit of a retail establishment. Typically this mode is always active. The RFID security devices include a second tamper mode in which tampering of the device is detectable. The tamper mode is configured to detect if, for example, the device is removed from a retail item. Both modes may be operable at the same time.

In some embodiments, the RFID security device includes two RFID tags the first operating in the anti-theft mode and the second being a switchable RFID tag. The switchable RFID tag is configured to become activated when the RFID security device is tampered with. For example the switchable RFID tag may be configured to generate an RFID signal after a conductor is broken or the RFID security device is removed from an article. This conductor is optionally disposed such that it is broken when tampering occurs.

A typically embodiment includes the RFID security device and an attached retail item, a tamper sensor disposed in a location where tampering is possible, and an exit sensor configured to detect theft. The tamper sensor is configured to detect the tamper mode of the RFID security device and may be placed in, for example a dressing room. See FIG. 8.

If someone attempts to remove the RFID security device near the tamper sensor then the tampering will be detected. If the security device and retail article are passed through the exit sensor, then this will be detected as well. When a legitimate sale occurs, the RFID security device may be removed at a point of sale. In some embodiments, a tamper sensor is also located at this location. This tamper sensor may be configured to detect the removal of the RFID security device from the retail article by an authorized sales person.

The detection of this event is optionally used for the purposes of inventory management. In some embodiments, the authorized sales person is optionally required to login so that he or she can be identified. In some embodiments, the RFID security device includes two separate RFID tags, one supporting the tamper mode and one supporting in the anti-theft mode. These two RFID tags optionally share an antenna. In some embodiments, the RFID security device includes one RFID tag configured to support both the anti-theft mode and the tamper mode.

FIG. 9 illustrates and embodiment of the RFID security device. The two RFID tags illustrated are typically configured to transmit different signals. These two different RFID tags optionally share an antenna. In alternative embodiments the two RFID tags are combined into one RFID tag configured to send at least two signals, one for anti-theft and one for anti-tamper.

Several embodiments are specifically illustrated and/or described herein. However, it will be appreciated that modifications and variations are covered by the above teachings and within the scope of the appended claims without departing from the spirit and intended scope thereof. For example, In some embodiments, Tag 160 is an active rather than a passive RFID tag. Examples discussed herein in relation to credit cards can equally be applied to other types of financial card such as a debit card, or prepaid card. For example, in some embodiments, RFID Tag 1800 is configured to change the ON/OFF state in response to a signal from a point of sale system indicating that an item has been sold. In these embodiments, RFID Tag 1800 is optionally configured to send different signals before and after a sale. A first of the different signals may be used to determine that the item has not yet been sold, and a second of the different signals may be used to determine that the item has been sold and/or may be returned. The features illustrated in FIGS. 18-20 are optionally included in embodiments illustrated by other figures of this application.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An inventory system including:
   an RFID reader configured to detect a signal from a switchable RFID tag, the signal being indicative of removal of the switchable RFID tag from an article;
   a point of sale device configured for recording a sale of the article and determine if removal of the RFID tag from the article was by an authorized sales person; and
   a memory configured to store an association of the signal and an identity of the article and to store an identity of the authorized sales person who removed the RFID tag from the article.

2. The inventory system of claim 1, further including the article, wherein the article includes electronics, clothing, pharmaceuticals, hardware, jewelry, or digital media.

3. The inventory system of claim 1, further including a circuit configured to identify when the removal of the switchable RFID tag occurs without a recording of the sale of the article.

4. The inventory system of claim 1, wherein the switchable RFID tag is also configured for tracking inventory of the article prior to sale.

5. The inventory system of claim 1, wherein the switchable RFID tag is configured to be detached from a first article and the attached to a second article.

6. The inventory system of claim 1, wherein the switchable RFID tag is attached to the article by an electrical conductor and the switchable RFID tag is responsive to a state of the electrical conductor.

7. The system of claim 1, further comprising the switchable RFID tag, wherein the switchable RFID tag comprises:
   a first circuit configured to change state when the security device is tampered with;
   a second circuit configured to send a first RF signal in response to the state; and
   a third circuit configured to send a second RF signal independent of the state.

8. The system of claim 7, wherein the state change is caused by the removal of the security device from a retail article.

9. The system of claim 7, wherein the first circuit and the second circuit are in separate RFID tags.

10. system of claim 7, wherein the first circuit and the second circuit are in the same RFID tag.

11. The system of claim 7, wherein the first circuit and the second circuit share an antenna.

12. The system of claim 7, wherein the second circuit is configured to send the first RF signal only when the state is changed.

13. The system of claim 7, further including a display surface configured for displaying information regarding an article, the information including a price, a SKU or a name, the display surface being on the security device.

14. The system of claim 1, further comprising the switchable RFID tag, wherein the switchable RFID tag comprises:
   a circuit configured to generate a first signal and a second signal, the first signal being responsive to tampering of a security device and the second signal being different from the first signal and being configured to detect movement of a retail article from a location;
   an antenna configured to receive an RF signal; and
   a power circuit configured to use the RF signal to power the circuit to send both the first and second signals.

15. The system of claim 7, wherein the first circuit is configured to change state when the second circuit is removed from an adhesive layer.

16. The security system of claim 14, wherein the circuit is configured to be attached to a retail article using a pin.

17. The security system of claim 1, further including the article.

* * * * *